(12) United States Patent
Iida et al.

(10) Patent No.: US 9,549,504 B2
(45) Date of Patent: Jan. 24, 2017

(54) TRANSAXLE SYSTEM FOR VEHICLE

(71) Applicant: Kanzaki Kokyukoki Mfg. Co., Ltd., Hyogo (JP)

(72) Inventors: Masaru Iida, Hyogo (JP); Toshifumi Yasuda, Hyogo (JP); Katsumoto Mizukawa, Hyogo (JP); Nobuhiro Shimobayashi, Hyogo (JP)

(73) Assignee: Kanzaki Kokyukoki Mfg. Co., Ltd., Hyogo (JP)

( * ) Notice: Subject to any disclaimer, the term of this patent is extended or adjusted under 35 U.S.C. 154(b) by 335 days.

(21) Appl. No.: 14/250,091

(22) Filed: Apr. 10, 2014

(65) Prior Publication Data

US 2014/0223898 A1    Aug. 14, 2014

Related U.S. Application Data

(63) Continuation-in-part of application No. 12/477,428, filed on Jun. 3, 2009, now Pat. No. 9,211,793.

(30) Foreign Application Priority Data

Jun. 6, 2008    (JP) .................................. 2008-149974

(51) Int. Cl.
*F16H 61/427* (2010.01)
*A01D 69/03* (2006.01)
(Continued)

(52) U.S. Cl.
CPC ............... *A01D 69/03* (2013.01); *A01D 34/69* (2013.01); *B60K 17/105* (2013.01);
(Continued)

(58) Field of Classification Search
CPC ........ F16H 61/427; B60K 17/28; E02F 9/225; E02F 9/2253
See application file for complete search history.

(56) References Cited

U.S. PATENT DOCUMENTS 3,054,263 A     9/1962  Budzich et al.
3,157,998 A *  11/1964  Harris ..................... F16H 39/10
                                                            60/389
(Continued)

FOREIGN PATENT DOCUMENTS

CA    2 417 313 A1    7/2003
DE    195 22 877 A1   2/1996

OTHER PUBLICATIONS

European Search Report for Appl. No. EP 09 16 1763 from the European Patent Office dated Sep. 19, 2009, 6 pgs.

*Primary Examiner* — F. Daniel Lopez
(74) *Attorney, Agent, or Firm* — Sterne, Kessler, Goldstein & Fox P.L.L.C.

(57) ABSTRACT

Transaxle systems for a vehicle are disclosed where each of right and left transaxle units includes a hydraulic pump, a hydraulic motor and a casing incorporating the hydraulic pump and motor. Each hydraulic pump has a pump displacement control means operatively connected to a pump control arm pivoted on the casing, and each hydraulic motor has a motor displacement control means operatively connected to a motor control arm pivoted on the casing. A single motor controlling manipulator is operatively connected to the motor control arms to simultaneously shift the motor displacement control means of the right and left transaxle units between large displacement positions and small displacement positions.

3 Claims, 33 Drawing Sheets

(51) Int. Cl.
    *A01D 34/69*     (2006.01)
    *B60K 17/10*     (2006.01)
    *E02F 9/22*     (2006.01)

(52) U.S. Cl.
    CPC ...... *F16H 61/427* (2013.01); *B60Y 2200/223* (2013.01); *E02F 9/225* (2013.01); *E02F 9/2253* (2013.01)

(56) References Cited

U.S. PATENT DOCUMENTS

| | | | |
|---|---|---|---|
| 3,213,619 A | | 10/1965 | Creighton et al. |
| 3,500,633 A | * | 3/1970 | Livezey ................ B60K 17/10 180/307 |
| 3,605,519 A | * | 9/1971 | Heggen ................ B62D 11/183 180/6.48 |
| 3,807,174 A | | 4/1974 | Wagenseil et al. |
| 3,968,706 A | * | 7/1976 | Bauer ................ B62D 11/183 74/471 R |
| 4,722,186 A | | 2/1988 | Louis et al. |
| 5,131,483 A | * | 7/1992 | Parkes ................ B62D 11/04 180/333 |
| 5,975,858 A | | 11/1999 | Shimotomai |
| 6,202,014 B1 | | 3/2001 | Brandt et al. |
| 6,385,971 B1 | | 5/2002 | Abend et al. |
| 7,290,390 B2 | | 11/2007 | Kim |
| 7,549,498 B2 | | 6/2009 | Lunzman et al. |

\* cited by examiner (a)

(b)

(a)

(b)

TRANSAXLE SYSTEM FOR VEHICLE

CROSS REFERENCE TO RELATED APPLICATIONS

This application is a continuation-in-part of U.S. application Ser. No. 12/477,428, filed on Jun. 3, 2009, the entire disclosure of which is incorporated herein by reference.

BACKGROUND OF THE INVENTION

Field of the Invention

The present invention relates to a transaxle system for a vehicle, especially, for a working vehicle equipped with a working device, e.g., a lawn mower equipped with a mower unit, wherein the vehicle transaxle system includes right and left transaxle units each of which supports a right or left corresponding single axle.

Related Art

As disclosed in U.S. Pat. No. 6,385,971, there is a well-known conventional zero-turn type vehicle transaxle system for a working vehicle, such as a lawn mower, for enabling zero-turn of the vehicle, thereby ensuring a satisfactory working efficiency. The transaxle system includes right and left hydraulic transaxle units each of which supports a right or left corresponding single axle. Each of the transaxle units includes a hydrostatic transmission for driving the corresponding axle, and the hydrostatic transmission includes hydraulic pump and motor fluidly connected to each other through a closed fluid circuit.

In each of the transaxle units of the conventional transaxle system, the hydraulic pump has a variable displacement, and the hydraulic motor has a fixed displacement, so that the output rotary speed of the hydraulic motor depends on controlling of the displacement of the hydraulic pump. Even if the maximum displacement of the hydraulic pump is sufficient to ensure a high torque traveling of the vehicle at work, it may be insufficient to ensure a required efficient power transmission for normal high-speed traveling of the vehicle without work. Therefore, conventionally, the transaxle unit further includes a sub speed-changing transmission, such as a gear transmission, that has at least two low-and-high speed drive trains and is interposed between the hydraulic motor and the axle. When the vehicle without work normally travels at a high speed, the high speed drive train of the sub speed-changing transmission is selected for driving the axle, so as to compensate for the lack of efficiency of power transmission by the hydrostatic transmission. However, the conventional transaxle unit is expanded in size and is expensive because of the arrangement of the sub speed-changing transmission.

Further, a sub speed-changing manipulator for operating the sub speed-changing transmission may be wrongly operated during traveling of the vehicle. For example, although a skilled operator can shift the sub speed-changing manipulator to a high speed setting position at an appropriate timing during traveling of the vehicle at work so as to improve the working efficiency, the operation of the sub speed-changing manipulator is too difficult for an unskilled operator to judge a timing for shifting the sub speed-changing manipulator to the high speed setting position, so that the unskilled operator may shift the sub speed-changing manipulator to the high speed setting position at a wrong timing so as to unexpectedly accelerate the vehicle and to spoil the stability of work. Further, if the vehicle frequently moves from one work area to another work area, a drive train for the working device must be clutched on and off on every movement of the vehicle between work areas. The high speed level of the sub speed-changing transmission may be desired during the movement of the vehicle between work areas. However, to perform both the clutch operation and the sub speed-changing operation is difficult and likely to unexpectedly keep the driving of the working device during the movement of the vehicle setting the high speed level of the sub speed-changing transmission, thereby causing power loss and spoiling the stability of work. Further, the sub-speed changing operation during traveling of the vehicle causes sudden change of traveling speed of the vehicle. Especially, the zero-turn type vehicle may be provided with a pair of right and left main speed-changing manipulators for controlling the respective hydraulic pumps of the respective right and left transaxle units. In this case, the manipulation of the right and left main speed-changing manipulators for the main speed-changing and left-and-right turning of the vehicle is complicated and likely to cause the wrong sub speed-changing operation. Therefore, the vehicle is desired to avoid unexpected speed change even if the sub speed-changing manipulator is wrongly operated.

Therefore, it is conceivable that the hydraulic motors of the respective transaxle units are configured to have respective displacement control means, e.g., movable swash plates, for changing their respective displacements so that the displacement control means of the hydraulic motors in the right and left transaxle units are operable to select a traveling mode of a vehicle between a low speed traveling mode for working traveling of the vehicle and a high speed traveling mode for on-road traveling of the vehicle, thereby eliminating additional sub speed-changing gear trains for changing speed ratios of axles to respective hydraulic motors so as to minimize the right and left transaxle units.

However, if the displacement control means of the hydraulic motors in the right and left transaxle units are movable swash plates, for example, the movable swash plates of the respective hydraulic motors have to be simultaneously operated in consideration of tilting directions of the movable swash plates of the hydraulic motors. Especially, if the hydraulic motors in the right and left transaxle units have rotary axes parallel or coaxial to respective axles, it should be considered that tilting directions of the movable swash plates between respective large tilt angles (defining large displacements for low speed level) and respective small tilt angles (defining small displacements for high speed level) are laterally opposite each other. A simple and economic operation system is desirable to enable such a simultaneous operation of the displacement control means of the hydraulic motors of the right and left transaxle units coping with the opposite rotational directions of the displacement control means, such as movable swash plates.

Further, if the movable swash plates of the hydraulic motors in the right and left transaxle units can be operated for accelerating a vehicle by manipulating not an additional sub speed-changing manipulator but the right and left main speed-changing manipulators that are frequently manipulated for controlling the respective hydraulic pumps in fluid delivery amount and direction during traveling of the vehicle, it is very convenient for an operator skilled in manipulating the right and left main speed-changing manipulators, and an operation system for controlling movable swash plates of the hydraulic pumps and motors in the right and left transaxle units can be entirely minimized. However, such an operation system should be configured so that movement of the movable swash plates of the hydraulic motors during traveling of the vehicle does not cause a sudden speed change that reduces the stability of the vehicle while traveling.

SUMMARY OF THE INVENTION

An object of the invention is to provide a transaxle system for a vehicle, especially, for a working vehicle, the transaxle system including right and left hydraulic transaxle units individually driving respective right and left axles, wherein variable displacement hydraulic motors for driving the respective axles are provided in the respective transaxle units and are provided with a simple, economic and efficient operation system for controlling displacements of the hydraulic motors.

To achieve the object, in a first aspect, a transaxle system for a vehicle comprises right and left axles, right and left transaxle units, a single motor controlling manipulator and right and left pump controlling manipulators. The right and left axles are drivingly connected to respective right and left drive wheels of the vehicle. The right and left transaxle units are mounted in the vehicle so as to drive the respective right and left axles. Each of the right and left transaxle units includes a variable displacement hydraulic motor for driving the corresponding right or left axle, a variable displacement hydraulic pump for supplying fluid to the corresponding hydraulic motor, and a transaxle casing supporting the corresponding right or left axle and incorporating the corresponding hydraulic pump and the corresponding hydraulic motor. The right and left axles project distally in the lateral direction of the vehicle from the respective transaxle casings of the right and left transaxle units. The hydraulic motor of each of the right and left transaxle units is provided with a motor displacement control means that is shiftable between a large displacement position and a small displacement position, whereby the motor displacement control means of the respective right and left transaxle units are operatively connected to respective motor control arms pivoted on outsides of the respective transaxle casings. The hydraulic pump of each of the right and left transaxle units is provided with a pump displacement control means that is shiftable to change fluid delivery amount and direction of the corresponding hydraulic pump, whereby the pump displacement control means of the respective right and left transaxle units are operatively connected to respective pump control arms pivoted on outsides of the respective transaxle casings. The motor controlling manipulator is provided in the vehicle and is operatively connected to both the motor control arms so that the motor controlling manipulator is manipulable to simultaneously rotate both the motor control arms so as to simultaneously shift both the motor displacement control means. The right and left pump controlling manipulators are provided in the vehicle and are operatively connected to the respective pump control arms so that the right and left pump controlling manipulators are manipulable to individually rotate the respective pump control arms so as to individually shift the respective pump displacement control means.

Therefore, the operative connection of the single motor controlling manipulator to both the motor displacement control means of the right and left transaxle units via both the motor control arms facilitates an operator to simultaneously shift both the motor displacement control means of the right and left transaxle units so as to select a rotational speed level of the right and left drive wheels of the vehicle regardless of however the pump displacement control means of each of the right and left transaxle units is set by manipulating each of the right and left pump controlling manipulators because only the single manipulator has to be manipulated for simultaneously shifting both the motor displacement control means.

Therefore, the shift of the motor control displacement means of the right and left transaxle units by manipulating the motor controlling manipulator is rather adaptable for selecting the rotational speed level of the right and left drive wheels of the vehicle while the vehicle is stationary, i.e., while the right and left pump controlling manipulators are manipulated to set both the pump displacement control means of the right and left transaxle units in their neutral states.

In the first aspect, the motor controlling manipulator is selectively located at either a low speed position for simultaneously setting both the motor displacement control means of the right and left transaxle units at the large displacement positions or a high speed position for simultaneously setting both the motor displacement control means at the small displacement positions.

Therefore, the two-positional selection of the motor controlling manipulator facilitates an operator to manipulate the motor controlling manipulator for shifting both the motor displacement control means because the operator can select either a low speed level or a high speed level as the rotational speed level of the right and left drive wheels of the vehicle by only selecting either the low speed position or the high speed position of the motor controlling manipulator.

In the first aspect, the transaxle system further comprises right and left first link members, right and left second link members and right and left bell cranks. The right and left first link members are operatively connected to the motor controlling manipulator. The right and left second link members are extended parallel to the right and left axles and are operatively connected to the respective motor control arms of the right and left transaxle units. Each of the right and left bell cranks has a pivot axis and first and second extension portions extended from the pivot axis perpendicularly to each other. The right and left first link members are connected to the respective first extension portions of the right and left bell cranks, and the right and left second link members are connected to the respective second extension portions of the right and left bell cranks.

Therefore, such a simple mechanical operation system including the right and left first and second link members and the right and left bell cranks enables the motor control arms of the right and left transaxle units to simultaneously rotate in opposite directions by only manipulating the single motor controlling manipulator in correspondence to a state where the motor control arms have to be rotated in opposite directions to synchronously shift both the motor displacement control means to either their large displacement positions or their small displacement positions.

To achieve the object, in a second aspect, a transaxle system for a vehicle comprises right and left axles, right and left transaxle units, and right and left pump controlling manipulators. The right and left axles are drivingly connected to respective right and left drive wheels of the vehicle. The right and left transaxle units are mounted in the vehicle so as to drive the respective right and left axles. Each of the right and left transaxle units includes a variable displacement hydraulic motor for driving the corresponding right or left axle, a variable displacement hydraulic pump for supplying fluid to the corresponding hydraulic motor, and a transaxle casing supporting the corresponding right or left axle and incorporating the corresponding hydraulic pump and the corresponding hydraulic motor. The right and left axles project distally in the lateral direction of the vehicle from the respective transaxle casings of the right and left transaxle units. The hydraulic motor of each of the right and left transaxle units is provided with a motor displacement control means that is shiftable between a large displacement position and a small displacement position, whereby the motor displacement control means of the respective right and left transaxle units are operatively connected to respective motor control arms rotatably pivoted on outsides of the respective transaxle casings. The hydraulic pump of each of the right and left transaxle units is provided with a pump displacement control means that is shiftable to change fluid delivery amount and direction of the hydraulic pump, whereby the pump displacement control means of the respective right and left transaxle units are operatively connected to respective pump control arms pivoted on outsides of the respective transaxle casings other than the outsides of the transaxle casings having the motor control arms pivoted thereon. The right and left pump controlling manipulators are provided in the vehicle and are operatively connected to the respective pump control arms so that the right and left pump controlling manipulators are manipulable to rotate the respective pump control arms so as to shift the respective pump displacement control means. Each of the right and left pump controlling manipulators is also operatively connected to the corresponding motor control arm so that each of the right and left pump controlling manipulators is also manipulable to rotate the corresponding motor control arm so as to shift the corresponding motor displacement control means from the large displacement position to the small displacement position only if the corresponding pump control arm is set to maximize the displacement of the corresponding hydraulic pump delivering fluid in a direction for forward traveling of the vehicle.

Therefore, the operative connection of the right and left pump controlling manipulators to the respective pump displacement control means of the right and left transaxle units via the respective pump control arms and to the respective motor displacement control means of the right and left transaxle units via the respective motor control arms facilitates an operator to accelerate each of the right and left drive wheels of the vehicle to a speed beyond a rotational speed of the corresponding drive wheel rotating in the forward direction of the vehicle defined by the maximum displacement of the hydraulic pump so as to expand a speed variation range of the drive wheel during traveling of the vehicle because the operator does not have to manipulate another manipulator than the right and left pump controlling manipulators.

Therefore, the shift of the respective motor displacement control means of the right and left transaxle units by manipulating the respective right and left pump controlling manipulators is rather adaptable for obtaining high rotational speeds of the respective right and left drive wheels of the vehicle during traveling of vehicle, i.e., when the respective right and left pump controlling manipulators are manipulated to set the respective pump displacement control means of the right and left transaxle at respective maximum displacement positions for forward traveling of the vehicle.

In the second aspect, a rotation range of each of the motor control arms for shifting the corresponding motor displacement control means from the large displacement position to the small displacement position includes a first range and a second range following the first range so that a first shift rate of the motor displacement control means relative to rotation of the motor control arm in the first range is smaller than a second shift rate of the motor displacement control means relative to rotation of the motor control arm in the second range.

Therefore, the first range defining the small first shift rate effects to avoid a sudden traveling speed change of the vehicle before an operator's manipulation degree of the pump controlling manipulator reaches a position where the operator expects start of acceleration by shifting the motor displacement control means. On the other hand, the second range defining the large second shift rate ensures efficient acceleration of the vehicle after the operator's manipulation degree of the pump controlling manipulator reaches the position where the operator expects start of acceleration by shifting the motor displacement control means.

These and other objects, features and advantages will appear more fully in the following detailed description with reference to the attached drawings.

DETAILED DESCRIPTION OF THE INVENTION

Figure 1:
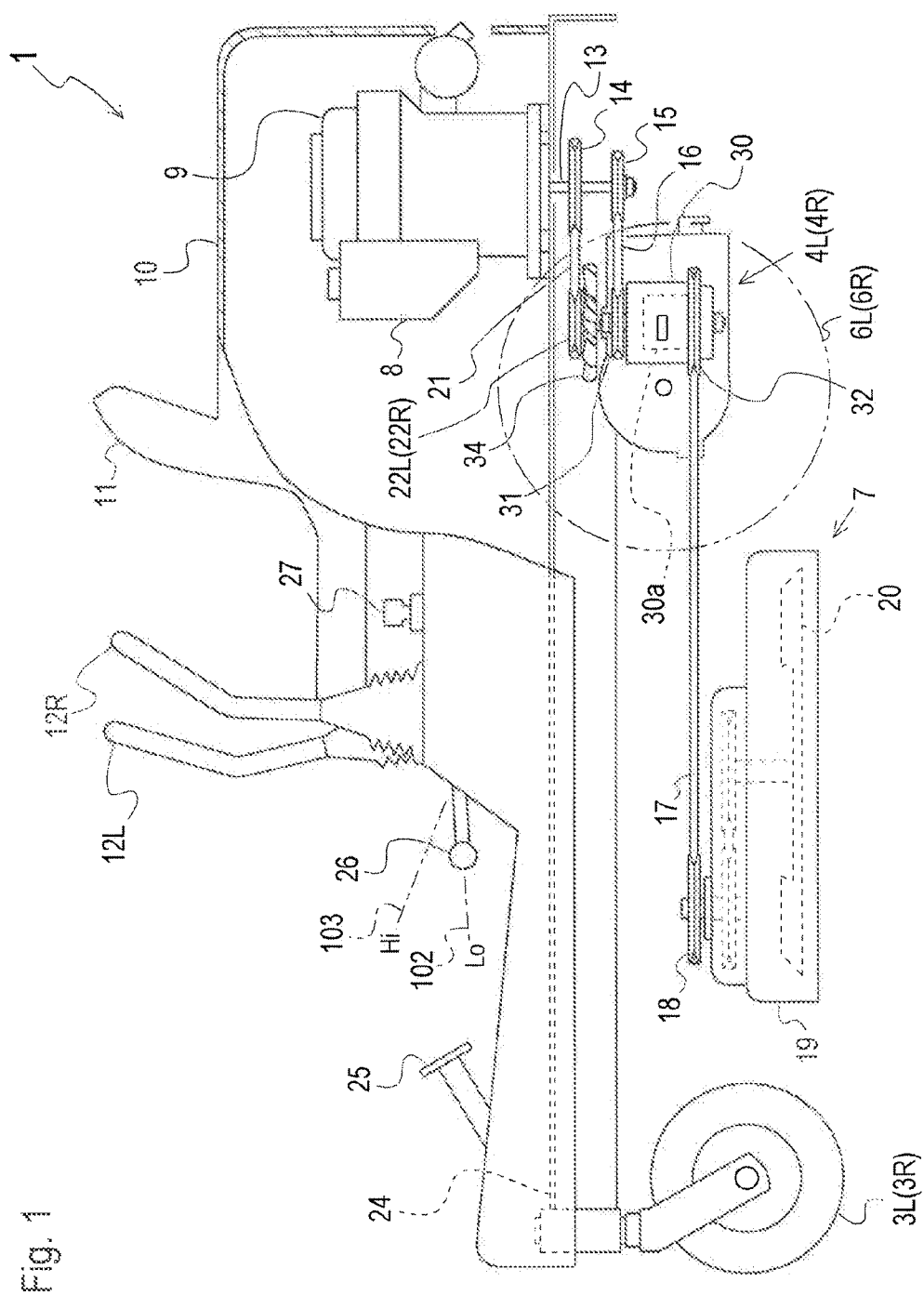
FIG. 1 is a schematic side view of a lawn mower serving as an embodiment of a working vehicle equipped with a vehicle transaxle system according to the invention.
Figure 2:
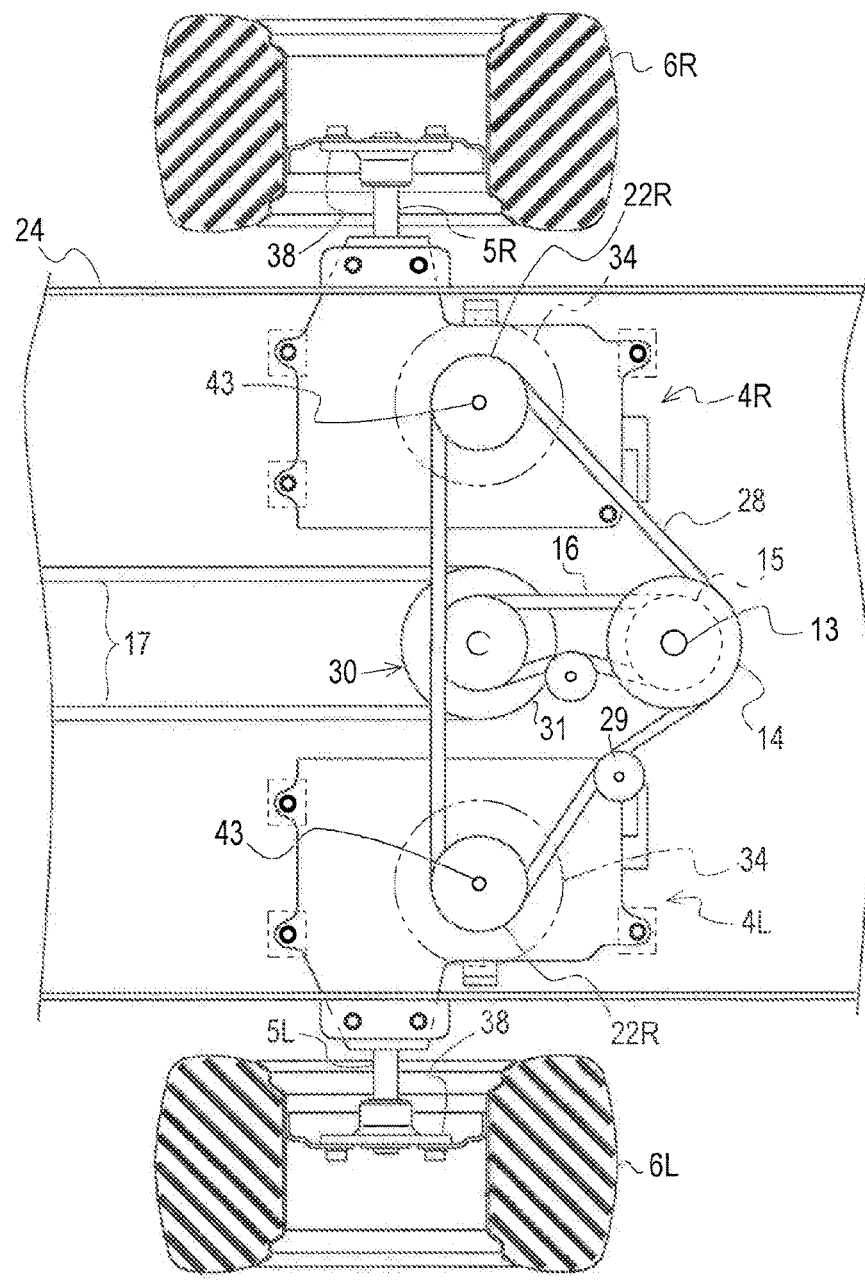
FIG. 2 is a sectional plan view of a rear portion of the lawn mower.
Figure 9:
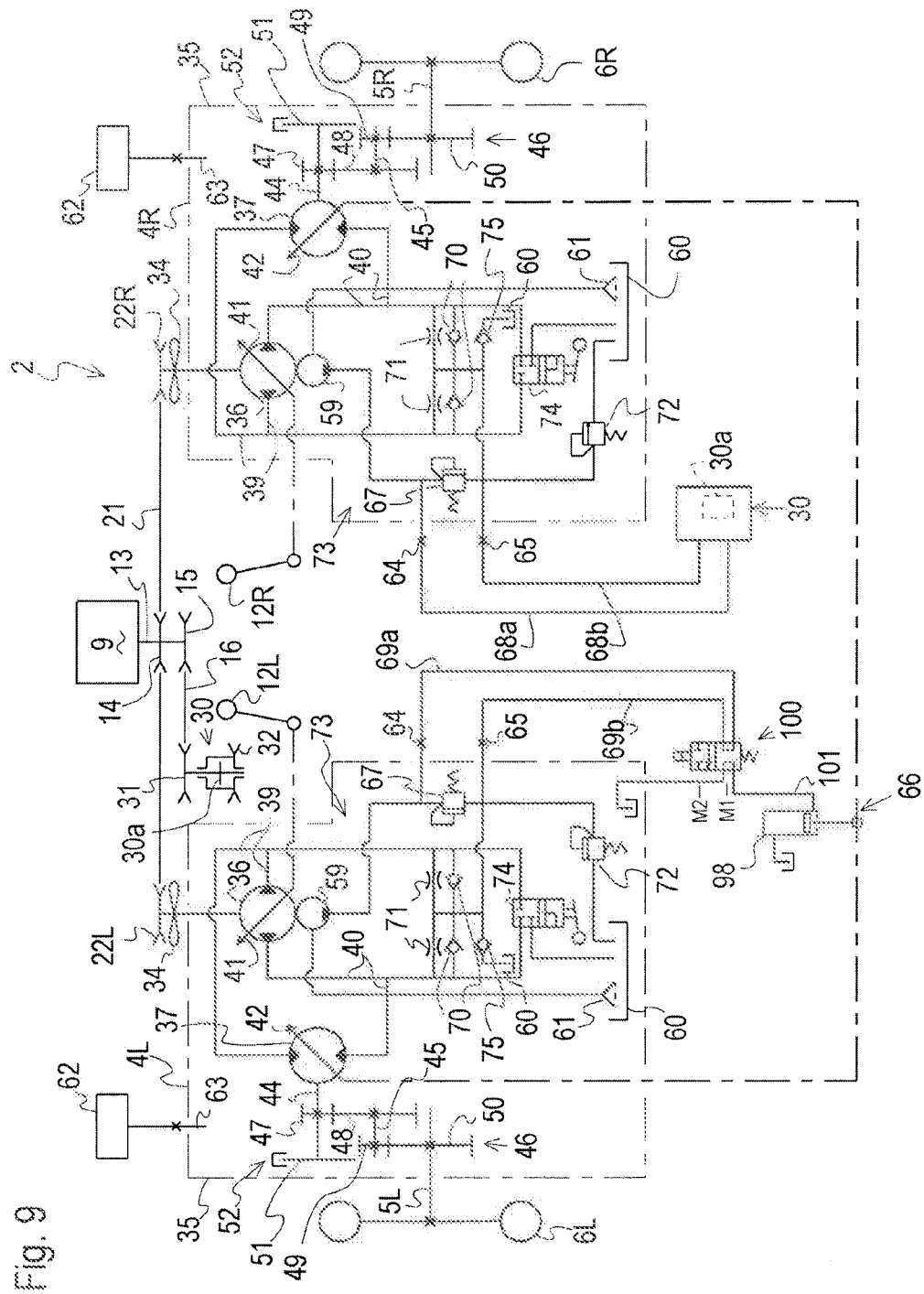
FIG. 9 is a diagram of a hydraulic circuit of the vehicle transaxle system.
Figure 10:
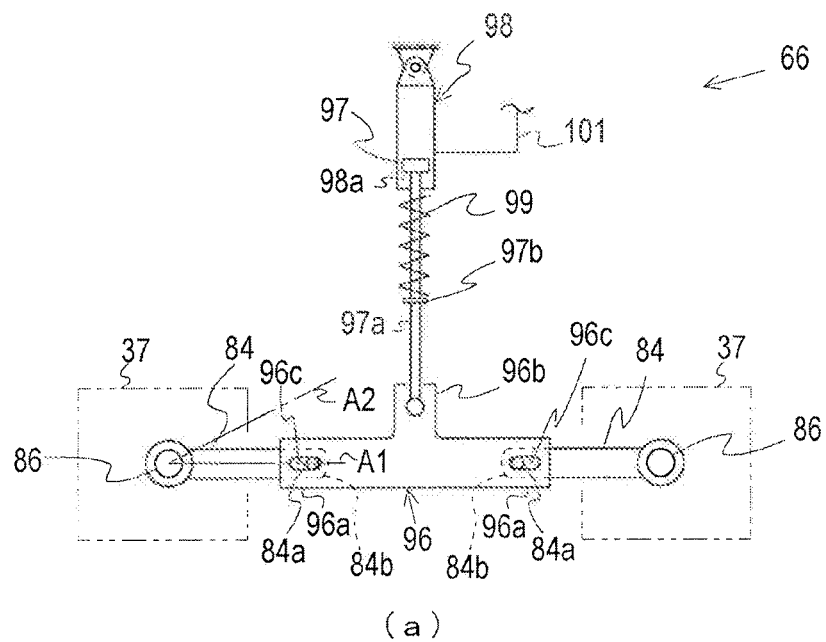
FIG. 10(a) is a diagram of a first interlocking connection means when setting hydraulic motors in a low speed mode.
FIG. 10(b) is a diagram of the first interlocking connection means when setting the hydraulic motors in a high speed mode.
Figure 10:
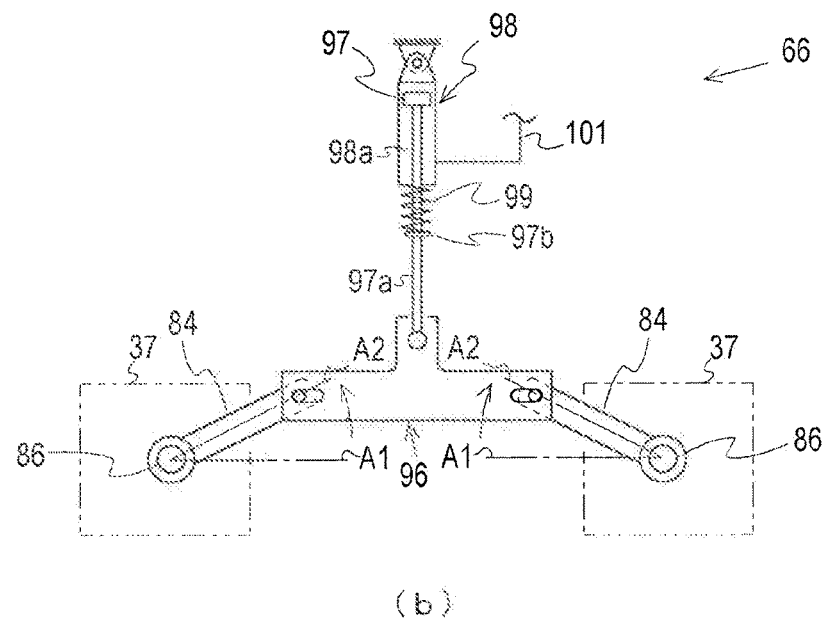
Figure 11:
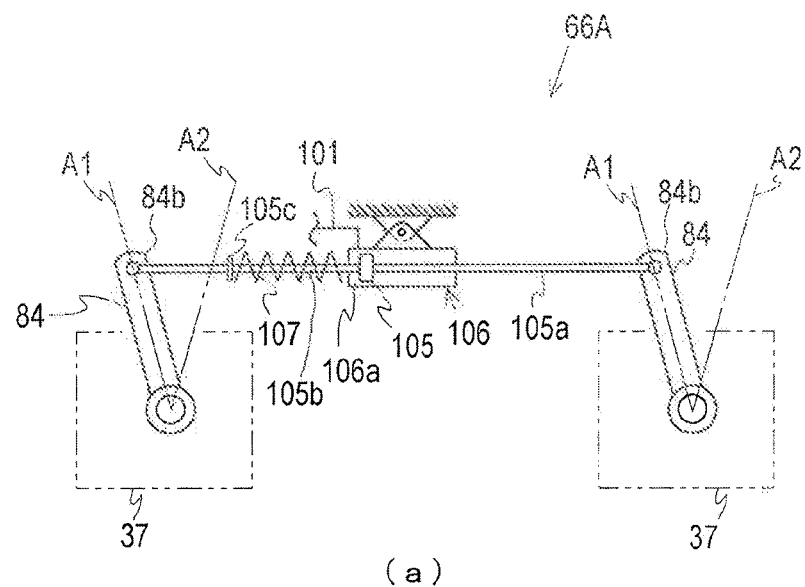
FIG. 11(a) is a diagram of a second interlocking connection means when setting the hydraulic motors in the low speed mode.
FIG. 11(b) is a diagram of the second interlocking connection means when setting the hydraulic motors in the high speed mode.
Figure 11:
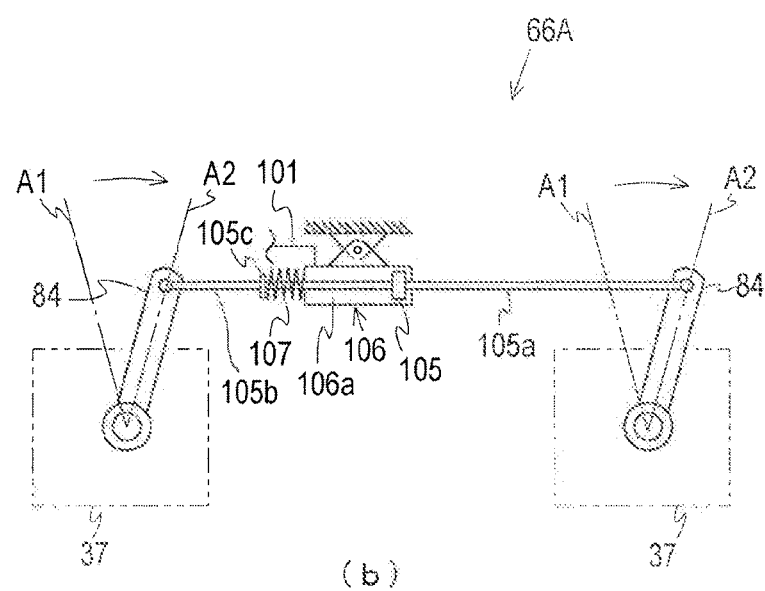

Referring to FIGS. 1, 2 and 9, description will be given of a general structure of a lawn mower serving as an embodiment of a hydraulically driven working vehicle 1 equipped with a transaxle system 2. Vehicle 1 includes a fore-and-aft extended vehicle body frame 24. Vehicle body frame 24 supports right and left front wheels (casters) 3R and 3L at right and left front portions thereof, and supports right and left transaxle units 4R and 4L constituting transaxle system 2 at right and left rear portions thereof.

Working vehicle 1 has a pair of right and left rear wheels 6R and 6L fixed on axially distal ends of respective right and left horizontal lateral axles 5R and 5L. Right transaxle unit 4R supports right axle 5R and extends right axle 5R rightwardly outward to right rear wheel 6R. Left transaxle unit 4L supports left axle 5L and extends left axle 5L leftwardly outward to left rear wheel 6L.

A mower unit 7 is disposed below a fore-and-aft intermediate portion of vehicle body frame 24 between front wheels 3R, 3L and rear wheels 6R, 6L. A prime mover 9, such as an internal combustion engine, is mounted on a rear portion of vehicle body frame 24 and is provided on a front end thereof with a fuel tank 8.

Working vehicle 1 is provided with a cover 10 covering vehicle body frame 24. A rear portion of cover 10 serves as a bonnet covering prime mover 9. A fore-and-aft intermediate portion of cover 10 is extended from the rear portion thereof covering prime mover 9, and is provided with a driver's seat 11 thereon. Right and left traveling control levers 12R and 12L, serving as a first manipulator for controlling later-discussed hydraulic pumps 36 (see FIG. 4) of transaxle units 4R and 4L, are provided on cover 10 at forward right and left sides of seat 11. A front portion of cover 10 is extended forward from the fore-and-aft intermediate portion of cover 10 on which seat 11 is mounted, and is formed lower than the fore-and-aft intermediate portion of cover 10 so as to serve as a platform. A brake pedal 25 is disposed on the front portion of cover 10.

A speed shift lever 26, serving as a second manipulator for controlling later-discussed hydraulic motors 37 (see FIG. 3) of transaxle units 4R and 4L, is provided on a front end of the fore-and-aft intermediate portion of cover 10 below seat 11 so as to be switchable between a low speed position 102 and a high speed position 103. An alternative speed shift manipulator, such as a later-discussed pedal 128 or a switch, may serve as the second manipulator for controlling hydraulic motors 37.

An instrumental panel is extended on an upper surface of the fore-and-aft intermediate portion of cover 10 along a right or left side of seat 11 and is provided with a key switch. The key switch is provided with a key slot and is switched on for allowing hydraulic motors 37 to be set in a high speed mode according to shift of speed shift lever 26 to high speed position 103 only when a safety control key 27 is inserted into the key slot, whereby an unskilled operator having no safety control key 27 is prevented from unexpected high-speed traveling. A later-discussed high-speed alarm lamp 125 (see FIG. 13) is provided on the instrumental panel.

Prime mover 9 has an output shaft 13 extended vertically downward therefrom. An upper pulley 14 and a lower pulley 15 are fixed on output shaft 13. A belt 28 is looped over upper pulley 14, is pressed by a tension pulley 29, and is looped over input pulleys 22R and 22L of respective right and left transaxle units 4R and 4L, so as to transmit the power of prime mover 9 to later-discussed hydrostatic transmissions (hereinafter, referred to as "HSTs") in respective right and left transaxle units 4R and 4L for driving respective right and left rear wheels 6R and 6L. Input pulleys 22R and 22L are provided with respective cooling fans 34 rotatable together therewith.

A PTO clutch unit 30 incorporating a PTO clutch 30*a*, such as a hydraulic clutch, is hung downward from vehicle body frame 24 in front of lower pulley 15. A dead space between right and left transaxle units 4R and 4L is used for arranging PTO clutch unit 30 so as to fore-and-aft minimize vehicle 1. A belt 16 is looped over lower pulley 15, is pressed by a tension pulley 29, and is looped over an input pulley 31 of PTO clutch unit 30. PTO clutch unit 30 is provided with an output pulley 32 to be drivingly connected to input pulley 31 via engaged PTO clutch 30*a*. A belt 17 is looped over output pulley 32 and a mower input pulley 18 of mower unit 7. Mower unit 7 includes a mower deck 19 incorporating rotary blades 20 driven by rotation of mower input pulley 18. Mower unit 7 is provided with a hydraulic lift for vertically moving mower deck 19.

Each of transaxle units 4R and 4L incorporates an HST 73 (see FIG. 9) including a variable displacement hydraulic pump 36 and a variable displacement hydraulic motor 37 fluidly connected to hydraulic pump 36 so as to drive corresponding axle 5R or 5L by an output power of hydraulic motor 37. Hydraulic pump 36 is provided with a movable swash plate 41 serving as a movable pump displacement control member.

Right traveling control lever 12R is operatively connected to movable swash plate 41 of hydraulic pump 36 of right transaxle unit 4R, and left traveling control lever 12L is operatively connected to movable swash plate 41 of hydraulic pump 36 of left transaxle unit 4L. When each of traveling control lever 12R and 12L is disposed at a neutral position, corresponding movable swash plate 41 is disposed at a neutral position so as to stop fluid supply from corresponding hydraulic pump 36 to corresponding hydraulic motor 37. As each of traveling control levers 12R and 12L is rotated forward from the neutral position, corresponding movable swash plate 41 is tilted to increase forward traveling speed of corresponding axle 5R or 5L and rear wheel 6R or 6L. As each of traveling control levers 12R and 12L is rotated rearward from the neutral position, corresponding movable swash plate 41 is tilted to increase backward traveling speed of corresponding axle 5R or 5L and rear wheel 6R or 6L. By synchronous rotation of right and left traveling control levers 12R and 12L, the rotary speeds and directions of right and left axles 5R and 5L and rear wheels 6R and 6L are equally changed so as to change the forward or backward straight traveling speed and direction of vehicle 1. By differential rotation of right and left traveling control levers 12R and 12L, the rotary speeds and directions of right and left axles 5R and 5L and rear wheels 6R and 6L are differentially changed so as to turn vehicle 1 leftward or rightward.

Figure 3:
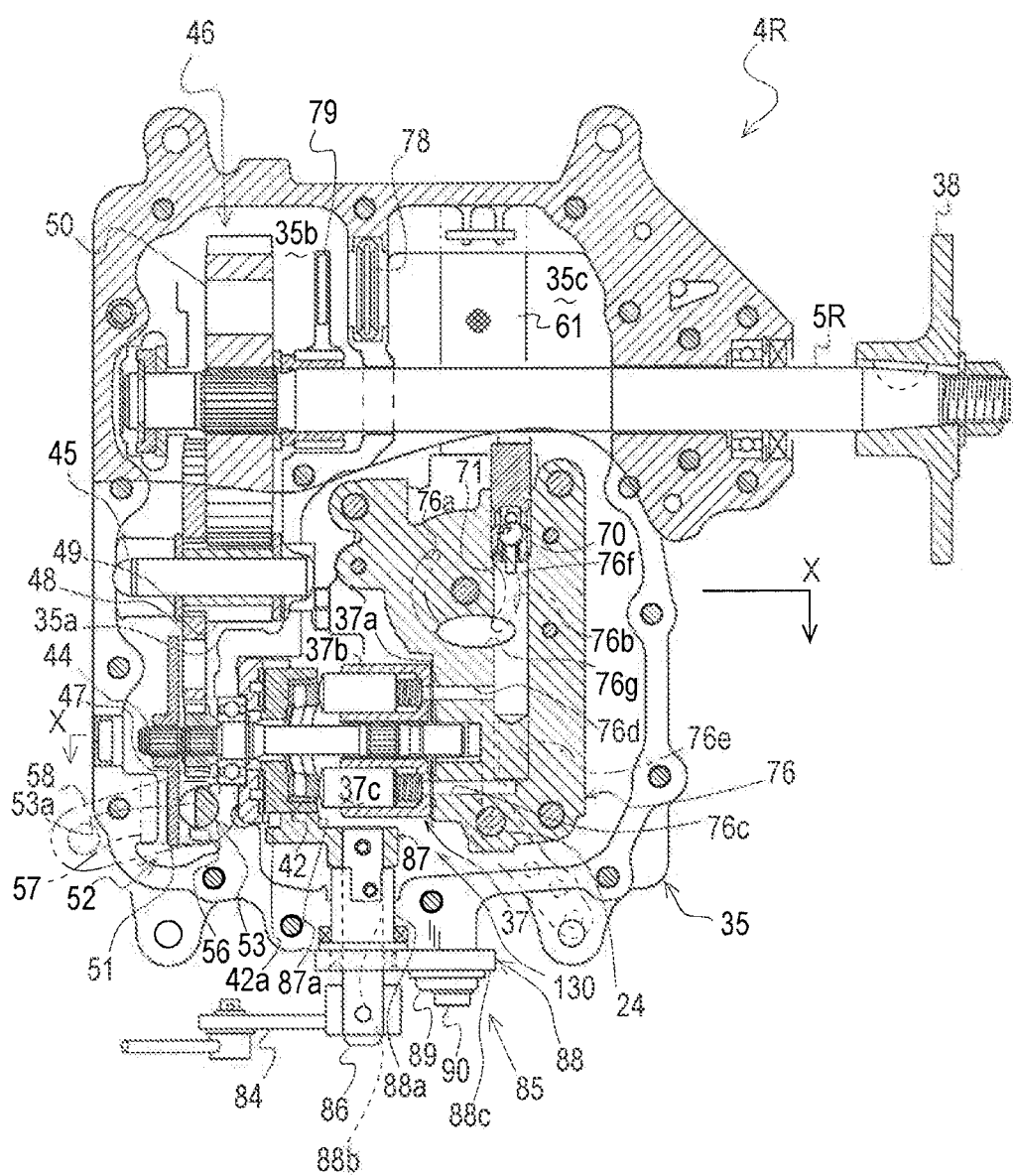
FIG. 3 is a sectional plan view of a right transaxle unit for the vehicle transaxle system.
Figure 5:
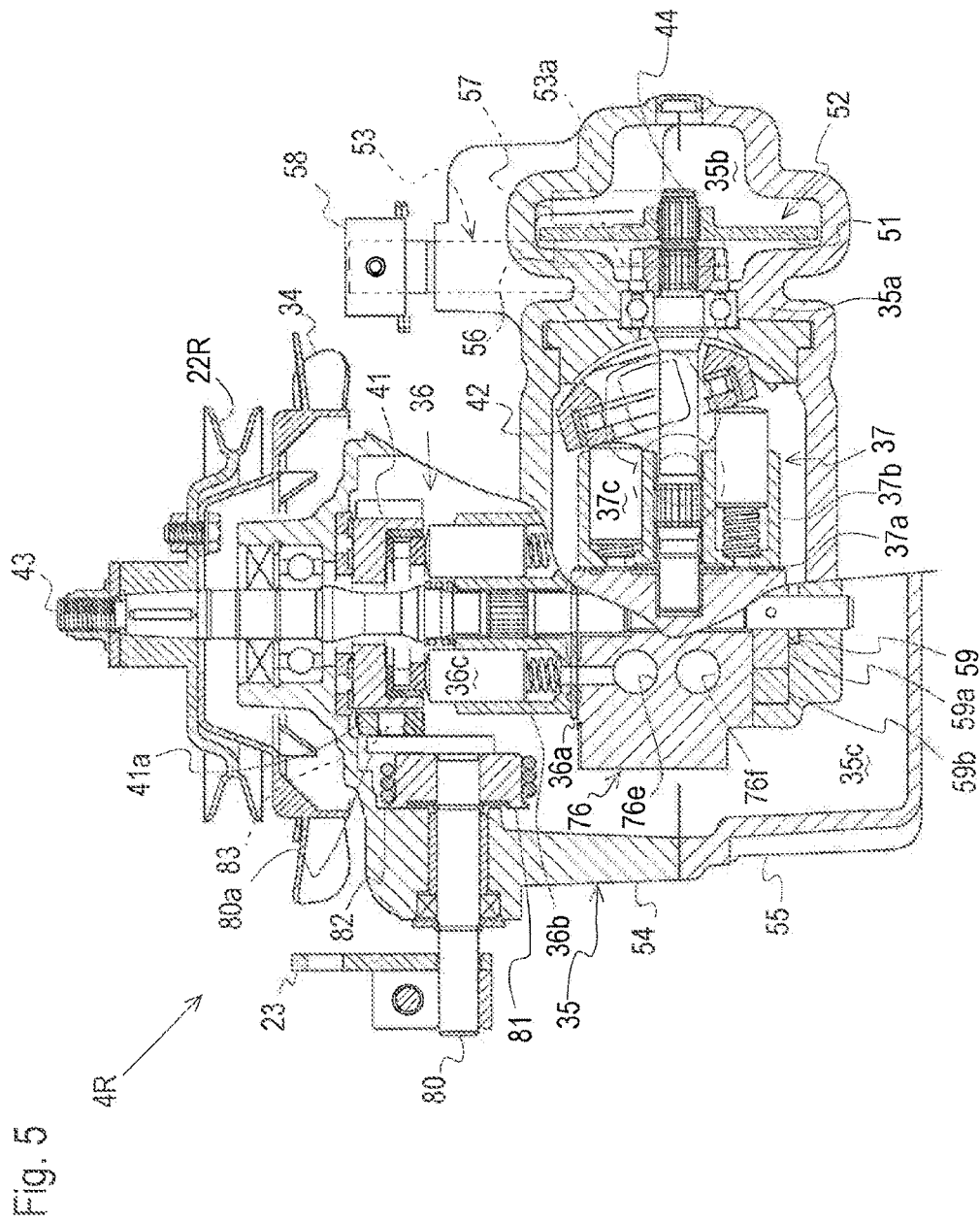
FIG. 5 is a cross sectional view taken along X-X line of FIG. 3.
Figure 6:
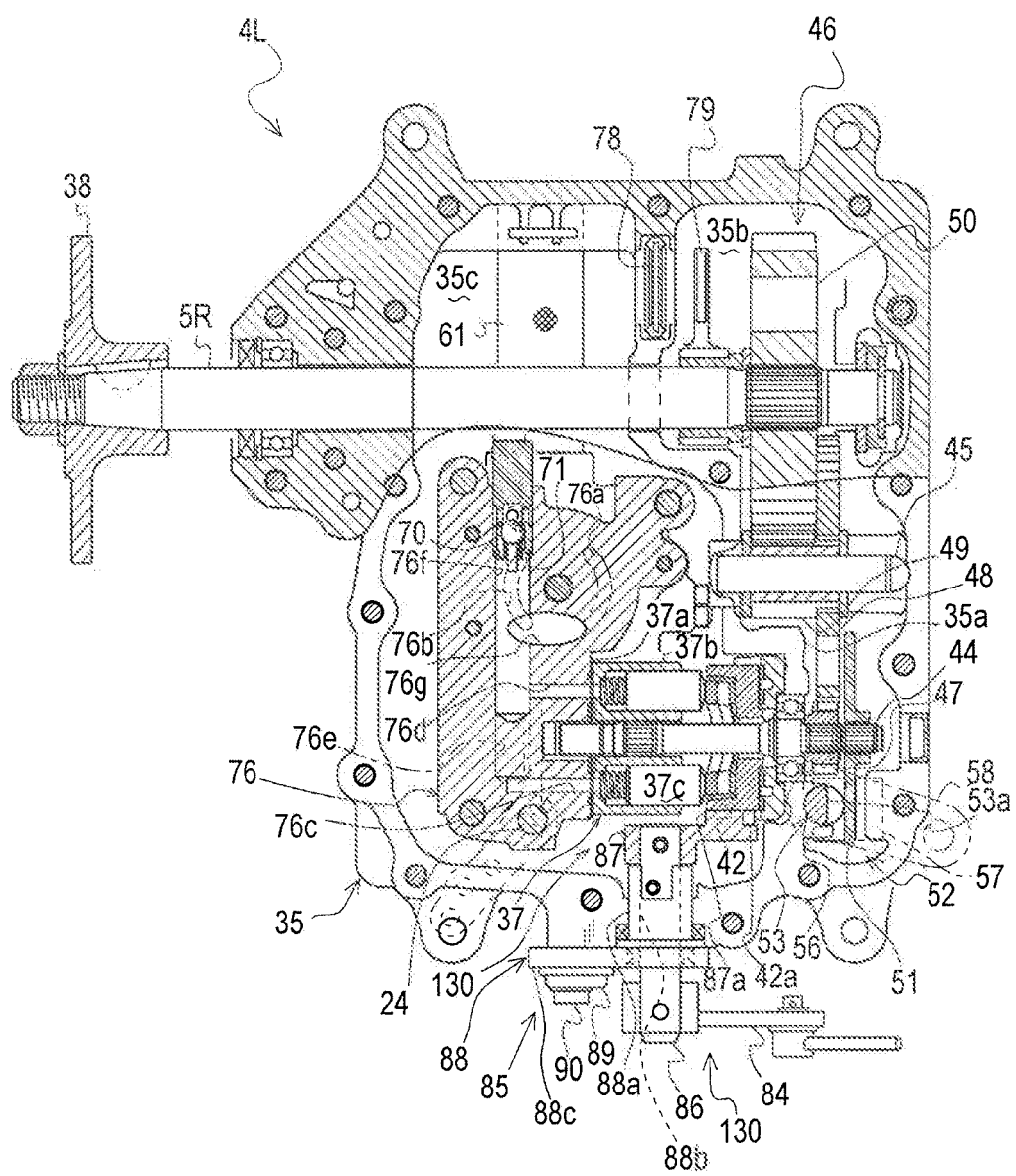
FIG. 6 is a sectional plan view of a left transaxle unit for the vehicle transaxle system.

Right and left transaxle units 4R and 4L are laterally symmetric as shown in FIGS. 3 and 6. Referring to FIGS. 3 to 9, description will be given of representative right traveling unit 4R as description of both right and left traveling units 4R and 4L while description of left traveling unit 4L is omitted except for a different point of left traveling unit 4L from right traveling unit 4R.

Transaxle unit 4R includes a transaxle housing 35 constituted by joining an upper housing half 54 and a lower housing half 55 to each other through a horizontal joint surface. Right axle 5R is journalled in transaxle housing 35 and is extended rightwardly outward from a right end of transaxle housing 35 so as to be fixedly provided on a distal end thereof with a flange 38 to which right rear wheel 6R is fixed. Incidentally, as shown in FIG. 6, left axle 5L is extended leftwardly outward from a left end of transaxle housing 35 of left transaxle unit 4L and is fixedly provided on a distal end thereof with a flange 38 to which left right rear wheel 6L is fixed.

Axial piston type hydraulic pump 36 and motor 37 constituting HST 73 are disposed in transaxle housing 35. Alternatively, radial piston type hydraulic pump and motor may be provided as an HST. Hydraulic pump 36 is provided with movable swash plate 41 as mentioned above, and hydraulic motor 37 is also provided with a movable swash plate 42 serving as a movable motor displacement control member.

Movable swash plate 41 of hydraulic pump 36 of right transaxle unit 4R is moved by operating traveling control lever 12R so as to change the direction and amount of fluid delivery from hydraulic pump 36 to hydraulic motor 37, thereby steplessly changing the rotary speed and direction of rear wheel 6R, as mentioned above. On the other hand, movable swash plate 42 is switchable between a low speed position and a high speed position by shifting speed shift lever 26 between low speed position 102 and high speed position 103 so as to decide either a low-speed deceleration ratio or a high-speed deceleration ratio of HST 73 in addition to the control of the direction and amount of fluid delivery from hydraulic pump 36 to hydraulic motor 37 by tilting movable swash plate 41.

A center section 76 constituting HST 73 is disposed in transaxle housing 35, so as to have a horizontal upper surface serving as a pump mounting surface. Hydraulic pump 36 is mounted onto the pump mounting surface of center section 76 so as to have a vertical pump shaft 43 which projects upwardly outward from transaxle housing 35 so as to be fixedly provided thereon with input pulley 22R and cooling fan 34.

Center section 76 disposed in transaxle housing 35 has a vertical motor mounting surface onto which hydraulic motor 37 is mounted so as to have a horizontal motor shaft 44 parallel to axle 5R. A deceleration gear train 46 is disposed in transaxle housing 35 and is interposed between motor shaft 44 and axle 5R. Deceleration gear train 46 includes a counter shaft 45 extended parallel to motor shaft 44 and axle 5R, and includes gears 47, 48, 49 and 50.

A partition wall 35*a* is formed in the inside of transaxle housing 35 so as to divide an inner space of transaxle housing 35 into an HST chamber 35*c* and a gear chamber 35*b*. Fluid is filled in transaxle housing 35 so as to serve as fluid sumps 60 in HST chamber 35*c* and gear chamber 35*b*.

HST 73 including hydraulic pump 36 and motor 37 and center section 76 is disposed in HST chamber 35*c* so as to be submerged in fluid sump 60, and deceleration gear train 46 is disposed in gear chamber 35*b*. With regard to deceleration gear train 46, motor shaft 44 is journalled by partition wall 35*a* via a bearing and is extended from HST chamber 35*c* into gear chamber 35*b*, motor output gear 47 is fixed on motor shaft 44 in gear chamber 35*b*, diametrically large and small gears 48 and 49 are provided on counter shaft 45 so as to be rotatable integrally with each other, bull gear 50 is fixed on axle 5R, diametrically large gear 48 meshes with motor output gear 47, and diametrically small final pinion 49 meshes with bull gear 50.

In gear chamber 35*b* of transaxle housing 35, an axial end portion of motor shaft 44 is extended from motor output gear 47, and a brake rotor 51 is fixed on the end portion of motor shaft 44 so as to constitute a wet type brake mechanism 52 submerged in fluid sump 60 in gear chamber 35*b*. Brake mechanism 52 includes a vertical brake camshaft 53 disposed between brake rotor 51 and partition wall 35*a*. Brake camshaft 53 is rotatably supported by upper housing half 54.

Brake camshaft 53 is formed to have a cam portion which is semicircular when sectionally viewed in plan and is disposed in transaxle housing 35. The cam portion of brake camshaft 53 has a vertical flat cam surface 53a which faces brake rotor 51. A brake shoe 56 is disposed between cam surface 53a and brake rotor 51. A brake pad 57 is disposed between brake rotor 51 and an inside surface of an outer wall of upper housing half 54.

A top portion of brake camshaft 53 projects upward from upper housing half 54 and is fixedly provided thereon with a brake arm 58. Brake arm 58 is rotatable together with brake camshaft 53 so as to be switched between a braking position and a non-braking position. When brake arm 58 is disposed at the non-braking position, cam surface 53a is extended parallel to a surface of brake shoe 56 facing cam surface 53a when viewed in plan, so as to allow rotation of brake rotor 51 and motor shaft 44 freely from brake shoe 56. When brake arm 58 is disposed at the braking position, cam surface 53a is slanted and a vertical edge thereof pushes brake shoe 56 against brake rotor 51, so that brake rotor 51 is pressed between brake shoe 56 and brake pad 57 and is braked together with motor shaft 44.

A bottom portion of center section 76 incorporates a charge pump 59 which is a torochoid pump including an inner gear 59a and an outer gear 59b surrounding inner gear 59a. Inner gear 59a is rotated together with pump shaft 43. A fluid filter 61 is extended from center section 76 in fluid sump 60 in HST chamber 35c. An external reservoir tank 62 is attached on an outside portion of transaxle housing 35 and is fluidly connected to fluid sump 60 in transaxle housing 35 via a siphon 63.

Transaxle housing 35 is formed with a pair of outlet port 64 and inlet port 65 that are opened outward from transaxle housing 35. As shown in FIG. 9, ports 64 and 65 of right transaxle unit 4R are connected to PTO clutch unit 30 via respective external fluid pipes 68a and 68b, and ports 64 and 65 of left transaxle unit 4L are connected via respective external fluid pipes 69a and 69b to a later-discussed hydraulic motor control valve 100 for controlling an interlocking connection means 66 connected to hydraulic motors 37 of right and left transaxle units 4R and 4L. In this way, PTO clutch unit 30 and hydraulic motor control valve 100, serving as external hydraulically-actuated implements, are supplied with fluid from respective transaxle housings 35 of right and left transaxles 4R and 4L via respective fluid-extraction pipes 68a and 69a, and return fluid to respective transaxle housings 35 via respective fluid-returning pipes 68b and 69b.

In each transaxle housing 35, an external-implement pressure regulation valve 67 is provided to regulate pressure of fluid flow from charge pump 59 to outlet port 64. In each of transaxle housings 35, center section 76 is formed therein with a pair of fluid passages 39 and 40 serving as a closed fluid circuit fluidly connecting hydraulic pump 36 and motor 37 mounted on center section 76 to each other, and inlet port 65 is adapted to be fluidly connected to fluid passages 39 and 40 through respective charge check valves 70. When one of fluid passages 39 and 40 is hydraulically depressed, corresponding charge check valve 70 is opened to supply fluid from inlet port 65 to hydraulically depressed fluid passage 39 or 40.

In each of transaxle housings 35, each of charge check valves 70 is bypassed by an orifice 71 which drains fluid front corresponding fluid passage 39 or 40 to fluid sump 60 or the other fluid passage 40 or 39 when corresponding fluid passage 39 or 40 is hydraulically pressurized higher than the other fluid passage 40 or 39, thereby expanding the neutral zone of HST 73 for stopping the fluid supply from pump 36 to motor 37 when the corresponding traveling control lever 12R or 12L is set to the neutral position, and thereby surely stopping rotation of axle 5R or 5L.

Further, HST 73 is provided with a bypass valve 74. Bypass valve 74 is normally closed as shown in FIG. 9. When vehicle 1 is towed, an operator opens bypass valve 74 so as to drain fluid from fluid passages 39 and 40 to fluid sump 60 so as to enable hydraulic motor 37 and corresponding axle 5R or 5L to rotate freely from the hydraulic pressure of HST 73.

Further, each HST 73 is provided with a check valve serving as a free wheel prevention valve 75. When vehicle 1 is parked on a slope and fluid leaks from the closed fluid circuit, charge pump 59 cannot supply fluid to the closed fluid circuit because prime mover 9 is stationary. However, free wheel valve 75 is naturally opened by the hydraulic depression of the closed fluid circuit so as to supply fluid from fluid sump 60 to an intermediate portion of a fluid passage between inlet port 65 and charge check valves 70, thereby keeping the hydraulic pressure of the closed fluid circuit that is surely applied as a dynamic brake to hydraulic motor 37 and corresponding axle 5R or 5L, and thereby preventing corresponding rear wheel 6R or 6L from unexpectedly rotating to cause vehicle 1 to descend the slope.

Figure 4:
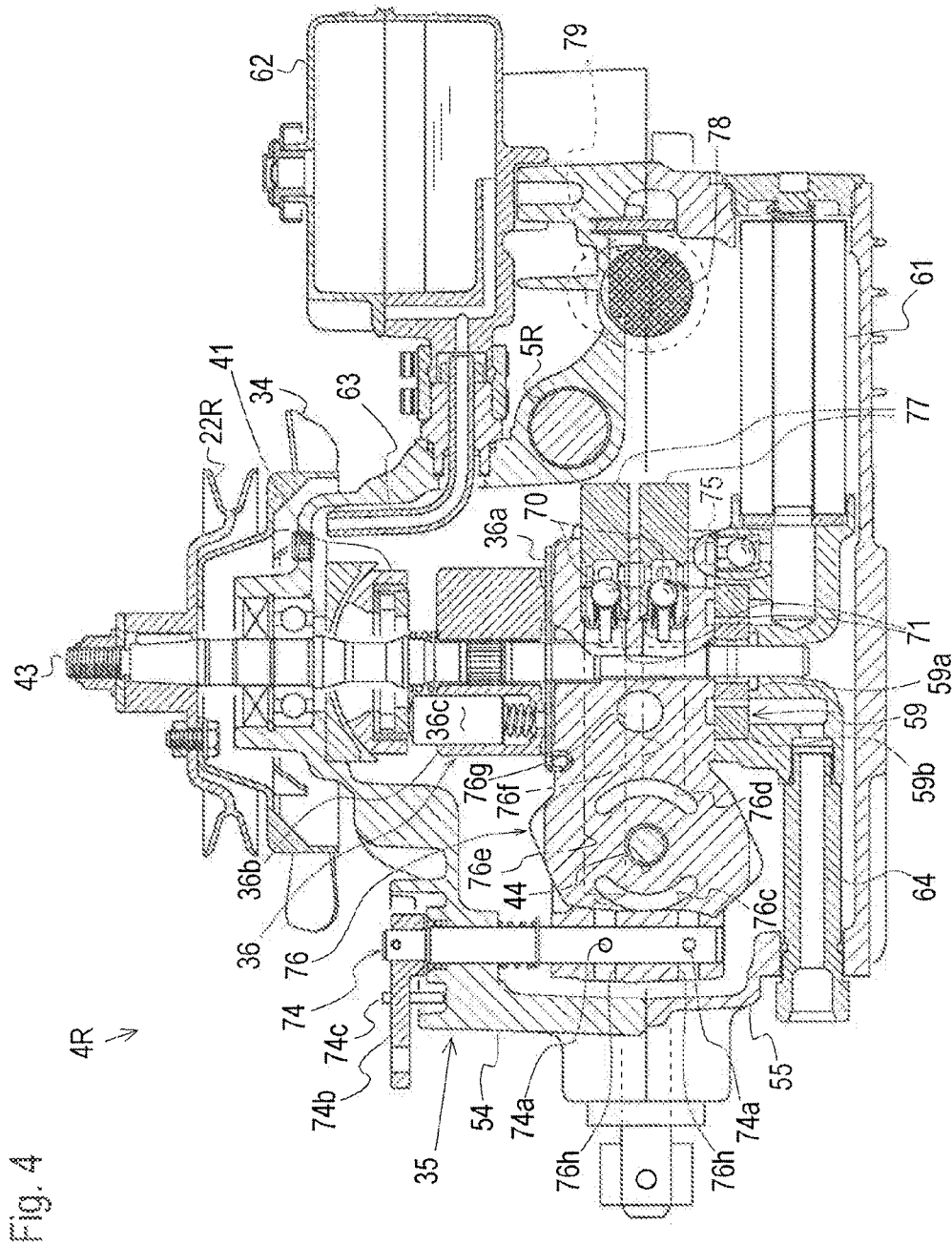
FIG. 4 is a sectional side view of the transaxle unit.

Referring to FIGS. 3 and 4, HST 73 in representative right transaxle unit 4R will be described in detail. A pair of kidney ports 76a and 76b are opened at the pump mounting surface of center section 76, and a pair of kidney ports 76c and 76d are opened at the motor mounting surface of center section 76. An upper fluid hole 76e and a lower fluid hole 76f are formed parallel to each other in center section 76 so as to extend horizontally in the fore-and-aft direction of vehicle 1 and to be juxtaposed on a vertical phantom surface. Upper fluid hole 76e is opened at a front portion thereof to kidney port 76b and is opened at a rear end thereof to kidney port 76c so as to serve as fluid passage 39 between hydraulic pump 36 and motor 37. A vertically slanted fluid hole 76g is formed in center section 76 and is extended upwardly slantwise from a front portion of lower fluid hole 76f so as to be opened to kidney port 76a, and lower fluid hole 76f is opened at a rear end thereof to kidney port 76d, so that fluid holes 76f and 76g serve as fluid passage 40 between hydraulic pump 36 and motor 37.

Fluid holes 76e and 76f are extended forward and are opened at front ends thereof outward from center section 76. A pair of charge check valve casings 77 are fitted into the respective open ends of fluid holes 76e and 76f. Each of charge check valve casings 77 incorporates charge check valve 70 and is formed therein with orifice 71 bypassing charge check valve 70.

A pair of upper and lower bypass fluid holes 76h are formed in center section 76, are extended from respective upper and lower fluid holes 76e and 76f, and are opened outward from center section 76 at the rear end of center section 76. A vertically axial rotary valve serving as bypass valve 74 is rotatably fitted in a rear portion of center section 76 so as to intersect upper and lower bypass fluid holes 76h. Bypass valve 74 is formed therein with upper and lower diametrical holes 74a corresponding to respective upper and lower bypass fluid holes 76h. A top portion of bypass valve 74 projects upward from upper housing half 54 and is fixedly provided thereon with a bypass arm 74b that are rotatable together with bypass valve 74 to be switched between a closed valve position and an opened valve position defined by respective steps formed on an upper surface of upper housing half 54. A stopper 54c projects from bypass arm 54b so as to be adapted to contact one of the steps defining the respective valve positions. Bypass arm 74*b* is normally set at the closed valve position so as to close bypass valve 74, as shown in FIG. 4, so that holes 74*a* are isolated from respective bypass fluid holes 76*h*. When vehicle 1 is towed, an operator rotates bypass arm 74*b* to the opened valve position so as to open bypass valve 74 so that holes 74*a* are opened to respective bypass fluid holes 76*h* to drain fluid from the closed fluid circuit in center section 76 to fluid sump 60.

Hydraulic pump 36 includes a valve plate 36*a*, a cylinder block 36*b*, pistons 36*c*, pump shaft 43 and movable swash plate 41. Valve plate 36*a* is fixed onto the pump mounting surface of center section 76. Cylinder block 36*b* is slidably rotatably fitted on valve plate 36*a*. Pump shaft 43 is fixed to cylinder block 36*b* and is extended on the center axis of cylinder block 36*b*. Pump shaft 43 is relatively rotatably passed through valve plate 36*a*, is relatively rotatably inserted into center section 76, and is fixed to inner gear 59*a* of charge pump 59 so as to serve as a drive shaft of charge pump 59. Pistons 36*c* are vertically reciprocally fitted into cylinder block 36*b* and are arranged at regular intervals around pump shaft 43.

Cradle type movable swash plate 41 is slidably rotatable fitted to an arcuate ceiling of upper housing half 54 and has a thrust bearing abutting against heads of pistons 36*c*. Pump shaft 43 is freely rotatably passed through movable swash plate 41, is journalled by a top portion of upper housing half 54 via bearings, and projects upwardly outward from the top portion of upper housing half 54. A horizontal pump control shaft 80 parallel to axle 5R is rotatably supported by upper housing half 54.

Outside transaxle housing 35 (with respect to right transaxle unit 4R, on a right outside of transaxle housing 35), a pump control arm 23 is fixed on an outer end of pump control shaft 80. A reel member 81 is fixed on an inner end portion of pump control shaft 80 inside housing 35. Inside transaxle housing 35, pump control shaft 80 is integrally formed at an inner end thereof with an inner arm 80*a*, and inner arm 80*a* is fitted into a recess 41*a* formed on movable swash plate 41 via an engaging member 83. A neutral returning spring 82 is wound around reel member 81 so as to bias pump control shaft 80, pump control arm 23 and movable swash plate 41 toward their neutral positions.

Hydraulic motor 37 includes a valve plate 37*a* fixed to the motor mounting surface of center section 76, a cylinder block 37*b* slidably rotatably fitted to valve plate 37*a*, pistons 37*c* laterally horizontally reciprocally fitted into cylinder block 37*b*, motor shaft 44 fixed to cylinder block 37*b* and defined as the center axis of cylinder block 37*b*, and cradle type movable swash plate 42 having a thrust bearing abutting against pistons 37*c*, and is configured similar to hydraulic pump 36.

Movable swash plate 42 is slidably rotatably fitted to upper and lower housing halves 54 and 55. A retainer (not shown) guiding the tilt of movable swash plate 42 is shaped vertically symmetric so that the rotary direction of motor shaft 44 relative to the rotary direction of pump shaft 43 can be reversed by vertically reversing the retainer while keeping the operative rotation direction of pump control arm 23. In other words, the retainer is configured to select whether the slant direction of the thrust bearing of movable swash plate 42 is upward or downward from the horizontal axis of motor shaft 44.

Referring to FIG. 5, motor shaft 44 is disposed at the center axis thereof on the horizontal joint surface between upper and lower housing halves 54 and 55. Motor shaft 44 is extended from cylinder block 37*b* opposite to center section 76 so as to freely rotatably pass through movable swash plate 42, and projects into gear chamber 35*b* so as to be provided with wet type brake mechanism 52 in gear chamber 35*b* as mentioned above. Motor shaft 44 is further extended from cylinder block 37*b* into center section 76 opposite to movable swash plate 42 and is journalled at an end portion thereof by center section 76.

Referring to FIGS. 3 and 5 to 8, description will be given of a tilt angle adjusting mechanism 85 for adjusting the tilt angle of movable swash plate 42 of hydraulic motor 37 in each of transaxle units 4R and 4L.

Hydraulic motor 37 is provided with a horizontal motor control shaft 86 having a center axis disposed on the horizontal joint surface between upper and lower housing halves 54 and 55 and rotatably supported by upper and lower housing halves 54 and 55 via a later-discussed shaft holder 88. An inner arm 87 is connected to an inner end of motor control shaft 86 inside transaxle housing 35, and is formed on a side end thereof with an engaging portion 87*a*. Movable swash plate 42 is formed with an engaging portion 42*a* to engage with engaging portion 87*a* of inner arm 87. Movable swash plate 42, inner arm 87 and motor control shaft 86 are defined as a movable motor displacement control member 130 of each of hydraulic motors 37 for selectively setting the displacement of hydraulic motor 37 to either a predetermined large displacement or a predetermined small displacement. Outside transaxle housing 35, a motor control arm 84 is fixed on an outer end of motor control shaft 86.

Tilt angle adjusting mechanism 85 includes shaft holder 88 provided on a rear surface of transaxle housing 35 so as to hold motor control shaft 86. Shaft holder 88 is formed integrally with a plate portion 88*c* and a boss portion 88*a* extended from plate portion 88*c*, and a boss hole 88*b* penetrates boss portion 88*a*. Plate portion 88*c* is disposed outside transaxle housing 35 and is fastened to transaxle housing 35 by bolts 89 and 90 with nuts. Boss portion 88*a* is fitted into an outwardly opened hole of transaxle housing 35. Motor control shaft 86 is rotatably passed through boss hole 88*b* in boss portion 88*a* fitted to transaxle housing 35. To adjust an angle of boss portion 88*a* relative to motor control shaft 86, bolts 89 and 90 are loosened and plate portion 88*c* is rotated around bolt 89.

Boss portion 88*a* is formed with a notch 91 extended substantially radially from the center axis of boss hole 88*b*. A pin 86*a* is fitted into a pin hole 86*b* formed in motor control shaft 86, and projects outward from pin hole 86*b* so as to be inserted into notch 91. Notch 91 has a width such as to allow only rotation of pin 86*a* between a position A1 and a position A2, thereby determining the tilt angle range of movable swash plate 42.

When pin 86*a* abuts against one end of notch 91 defined as position A1, movable swash plate 42 is disposed at a tilt angle for realizing a maximum displacement of hydraulic motor 37. That is, position A1 is defined as a low speed position of motor control shaft 86 for realizing a low rotary speed level of motor shaft 44. When pin 86*a* abuts against the other end of notch 91 defined as position A2, movable swash plate 42 is disposed at a tilt angle for realizing a minimum displacement of hydraulic motor 37. That is, position A2 is defined as a high speed position of motor control shaft 86 for realizing a high rotary speed level of motor shaft 44.

Further, the relative angle of boss portion 88*a* to motor control shaft 86 therethrough can be changed to adjust the maximum and minimum displacements of hydraulic motor 37. In this regard, plate portion 88*c* of shaft holder 88 is formed with a first slot 88d, and a bush 93 is inserted into first slot 88d. An eccentric axial hole 93a penetrates bush 93, and bolt 89 is passed through hole 93a and is screwed into transaxle housing 35. When bolt 89 is loosened, bush 93 becomes rotatable around bolt 89, and the rotation of bush 93 centered on bolt 89 adjusts the angle of boss 88a centered on motor control shaft 86.

A second slot 88e is formed in plate portion 88c of shaft holder 88. A bolt 94 is passed through second slot 88e, and is screwed into transaxle housing 35, so as to fasten plate portion 88c to transaxle housing 35 after the above-mentioned adjustment of the angle of boss 88a relative to motor control shaft 86. In this way, right and left transaxle units 4R and 4L are provided with respective hydraulic motors 37 having respective minutely adjustable minimum and maximum displacements regardless of assembling deviation of hydraulic motors 37 when assembled into respective transaxle units 4R and 4L, thereby ensuring the straight traveling performance of vehicle 1.

Incidentally, hydraulic motor 37 may be provided with a detent mechanism for retaining motor control shaft 86 at either low speed position A1 or high speed position A2. The detent mechanism may be a ball-type having a detent ball and a spring for pressing the detent ball. The detent mechanism may be interposed between boss portion 88a and motor control shaft 86. Alternatively, hydraulic motor 37 may be provided with a means for retaining motor control shaft 86 at an optional position between low speed position A1 and high speed position A2 by a frictional force or the like, so that another middle speed level of motor shaft 44 may be set in addition to the low speed level and the high speed level.

Referring to FIGS. 1, 3 and 9-12, description will be given of some interlocking connection means, each of which interlockingly connects movable motor displacement members 130 of respective hydraulic motors 37 of right and left transaxle units 4R and 4L to speed shift lever 26 so as to be operated to synchronously operate both movable motor displacement members 130 by operating speed shift lever 26.

Referring to FIGS. 10(a) and 10(b), an interlocking connecting means 66 includes a T-shaped connection stay 96 (serving as a mechanical connection member) and a hydraulic cylinder 98 with a piston 97 therein (serving as a push-pull type actuator). Right and left motor control arms 84 (serving as a pair of operation members) of respective hydraulic motors 37 of right and left transaxle units 4R and 4L are disposed on a common surface, and are connected at respective tips thereof to respective opposite right and left end portions 96a of connection stay 96 placed on the surface. Connection stay 96 has a bar extended between opposite end portions 96a and has an end portion 96b extended from an intermediate portion of the bar perpendicular to the bar. Piston 97 is fluid-tightly and slidably fitted in cylinder 98. A piston rod 97a is extended from piston 97 and outward from cylinder 98, and is connected at a tip thereof to end portion 96b of connection stay 96. Cylinder 98 is pivoted at a bottom end thereof onto vehicle body frame 24.

Right and left motor control arms 84 are formed with respective pins 84a. Right and left end portions 96a of connection stay 96 are formed therein with respective slots 96c extended in the longitudinal direction of the bar of connection stay 96. Pins 84a of respective right and left motor control arms 84 are slidably fitted in slots 96c in respective right and left end portions 96a of connection stay 96, thereby allowing motor control arms 84 to rotate relative to connection stay 96. More specifically, the laterally symmetric arrangement of right and left motor control arms 84 is kept regardless of movement of connection stay 96 according to the telescopic movement of piston rod 97a relative to cylinder 98.

A spring retainer 97c is formed on an axial intermediate portion of piston rod 97a, and a spring 99 is wound around piston rod 97a between cylinder 98 and spring retainer 97c so as to bias piston rod 97a toward end portion 96b of connection stay 96, so that piston rod 97a is biased to extend outward from cylinder 98. Cylinder 98 is a single action type cylinder having a fluid chamber 98a on one axial side of piston 97 with piston rod 97a. Cylinder 98 is provided with a port opened to fluid chamber 98a, and as shown in FIG. 9, this port is connected to hydraulic motor control valve 100 via a fluid passage 101, and hydraulic motor control valve 100 is fluidly connected to outlet and inlet ports 64 and 65 of transaxle housing 35 of one transaxle unit 4R or 4L (in this embodiment, left transaxle unit 4L) as mentioned above.

Hydraulic motor control valve 100 is a solenoid valve electrically controlled via a later-discussed electric circuit 104 (see FIG. 13) based on sensing a position of speed shift lever 26. When speed shift lever 26 is set at low speed position 102, hydraulic motor control valve 100 is disposed at a low speed position M1 so as to stop the fluid supply to fluid chamber 98a. At this time, due to the force of spring 99, piston rod 97a is extended outward from cylinder 98 and connection stay 96 is located at a low speed position shown in FIG. 10(a), wherein, in this embodiment, both motor control arms 84 are linearly aligned with the bar of connection stay 96, thereby retaining motor control shafts 86 at respective low speed positions A1 that have been predetermined by respective tilt angle adjusting mechanisms 85. Therefore, the maximum displacements of hydraulic motors 37 are set so as to realize the low rotary speed levels of motor shafts 44.

When speed shift lever 26 is set at a high speed position 103, hydraulic motor control valve 100 is disposed at a high speed position M2 so as to supply fluid to fluid chamber 98a. At this time, piston rod 97a is withdrawn into cylinder 98 against spring 99 so that connection stay 96 is located at a high speed position shown in FIG. 10(b), wherein, in this embodiment, motor control arms 84 are rotated to have angles from the bar of connection stay 96, thereby retaining motor control shafts 86 at respective high speed positions A2. Therefore, the minimum displacements of hydraulic motors 37 are set so as to realize the high rotary speed levels of motor shafts 44.

Incidentally, hereinafter, low speed position A1 of motor control shaft 86 is also defined as low speed position A1 of motor control arm 84, and low speed position A1 of motor control shaft 86 is also defined as low speed position A1 of motor control arm 84. The positions of motor control arms 84 defined as low speed position A1 and high speed positions A2 are not limited to those shown in FIGS. 10(a) and 10(b).

Referring to FIGS. 11(a) and 11(b), an alternative interlocking connection means 66A is configured to keep a parallel arrangement of motor control arms 84 in comparison with interlocking connection means 66 configured to keep the symmetric arrangement of motor control arms 84. In this regard, interlocking connection means 66A includes a hydraulic cylinder 106 serving as a push-pull type actuator, and piston rods 105a and 105b extended from cylinder 106 are directly connected to motor control arms 84 disposed parallel to each other. Alternatively, motor control arms 84 may not be parallel, and may be rotated to keep a certain relative angle therebetween. In this way, piston rods 105a and 105b serve as the mechanical connection member by themselves, so that interlocking connection means 66A uses no additional mechanical connection member like connection stay 96, interposed between piston rods 105a and 105b and motor control arms 84, thereby reducing the number of parts, costs, and labor for maintenance.

Further, interlocking connection means 66A is based on that right and left motor control shafts 86 are adapted to rotate in the same direction so as to be shifted from respective low speed positions A1 to respective high speed positions A2, while interlocking connection means 66 is based on that right and left motor control shafts 86 are adapted to rotate in opposite directions so as to be shifted from respective low speed positions A1 to respective high speed positions A2. The tilt directions of movable swash plates 42 of hydraulic motors 37 relative to the axes of respective motor shafts 44 must be determined in consideration of the rotary directions of respective motor control shafts 86 while movable swash plates 41 of hydraulic pumps 36 are set to rotate motor shafts 44 in the same direction. Therefore, as mentioned above, each of the retainers of movable swash plates 42 is configured to selectively set movable swash plate 42 in either the upwardly slant direction or the downwardly slant direction.

With regard to interlocking connection means 66A, a piston 105 is fluid-tightly and slidably fitted in cylinder 106, coaxially opposite right and left piston rods 105a and 105b are extended from piston 105 and oppositely outward from cylinder 106 so as to be connected at respective tips thereof to the tips of respective motor control arms 84. A spring retainer 105c is formed on an axial intermediate portion of one of piston rods 105a and 105b (in this embodiment, left piston rod 105b), and a spring 107 is wound around piston rod 105b between cylinder 106 and spring retainer 105c so as to bias piston rods 105a and 105b in one direction (in this embodiment, leftward), thereby biasing motor control shafts 86 and motor control arms 84 toward respective low speed positions A1. Cylinder 106 is a single action type cylinder having a fluid chamber 106a on one axial side of piston 105 (in this embodiment, on the left side of piston 105 with left piston rod 105b). Cylinder 106 is provided with a port opened to fluid chamber 106a. Cylinder 106 corresponds to cylinder 98 shown in FIG. 9, and the port opened to fluid chamber 106a is connected to hydraulic motor control valve 100 via fluid passage 101, similar to the port of cylinder 98 as mentioned above.

Therefore, when speed shift lever 26 is set at low speed position 102, hydraulic motor control valve 100 is disposed at low speed position M1 so as to stop the fluid supply to fluid chamber 106a, so that, due to the force of spring 107, piston rods 105a and 105b retain motor control arms 84 and shafts 86 at respective low speed positions A1 for setting the maximum displacements of hydraulic motors 37, as shown in FIG. 11(a). When speed shift lever 26 is set at a high speed position 103, hydraulic motor control valve 100 is disposed at high speed position M2 so as to supply fluid to fluid chamber 106a, so that piston rods 105a and 105b move against spring 107 to set motor control arms 84 and shafts 86 at respective high speed positions A2 for setting the minimum displacements of hydraulic motors 37, as show in FIG. 11(b).

Figure 12:
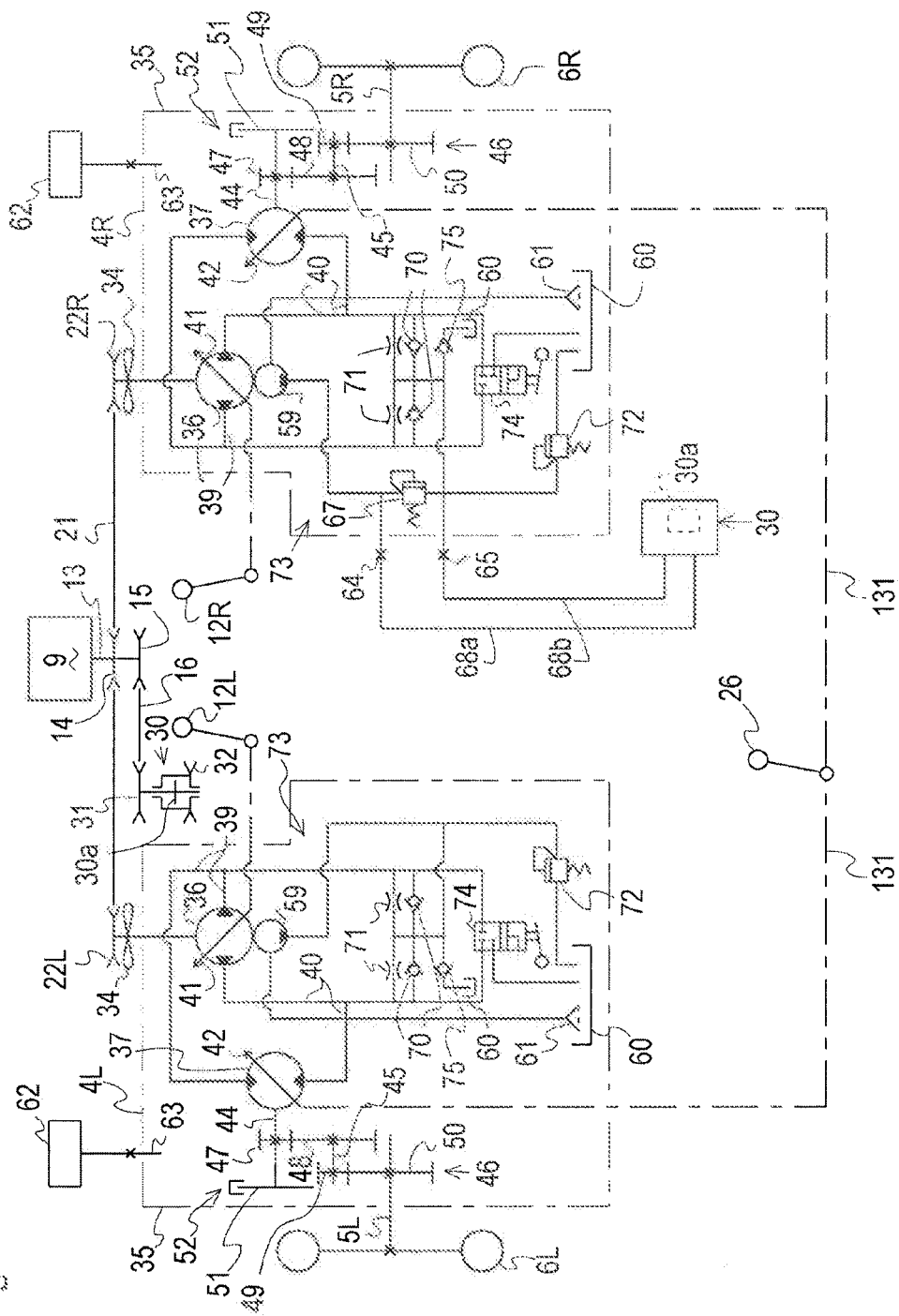
FIG. 12 is a diagram of an alternative hydraulic circuit of the vehicle transaxle system.

Each of interlocking connection means 66 and 66A uses hydraulic and electric control elements as mentioned above. Alternatively, as shown in FIG. 12, speed shift lever 26 may be connected via simple mechanical connection members 131, such as wires, to movable swash plates 42 of hydraulic motors 37. Such a simple connection of speed shift lever 26 to movable swash plates 42 of hydraulic motors 37 is advantageous in economizing and minimizing vehicle 1.

Figure 13:
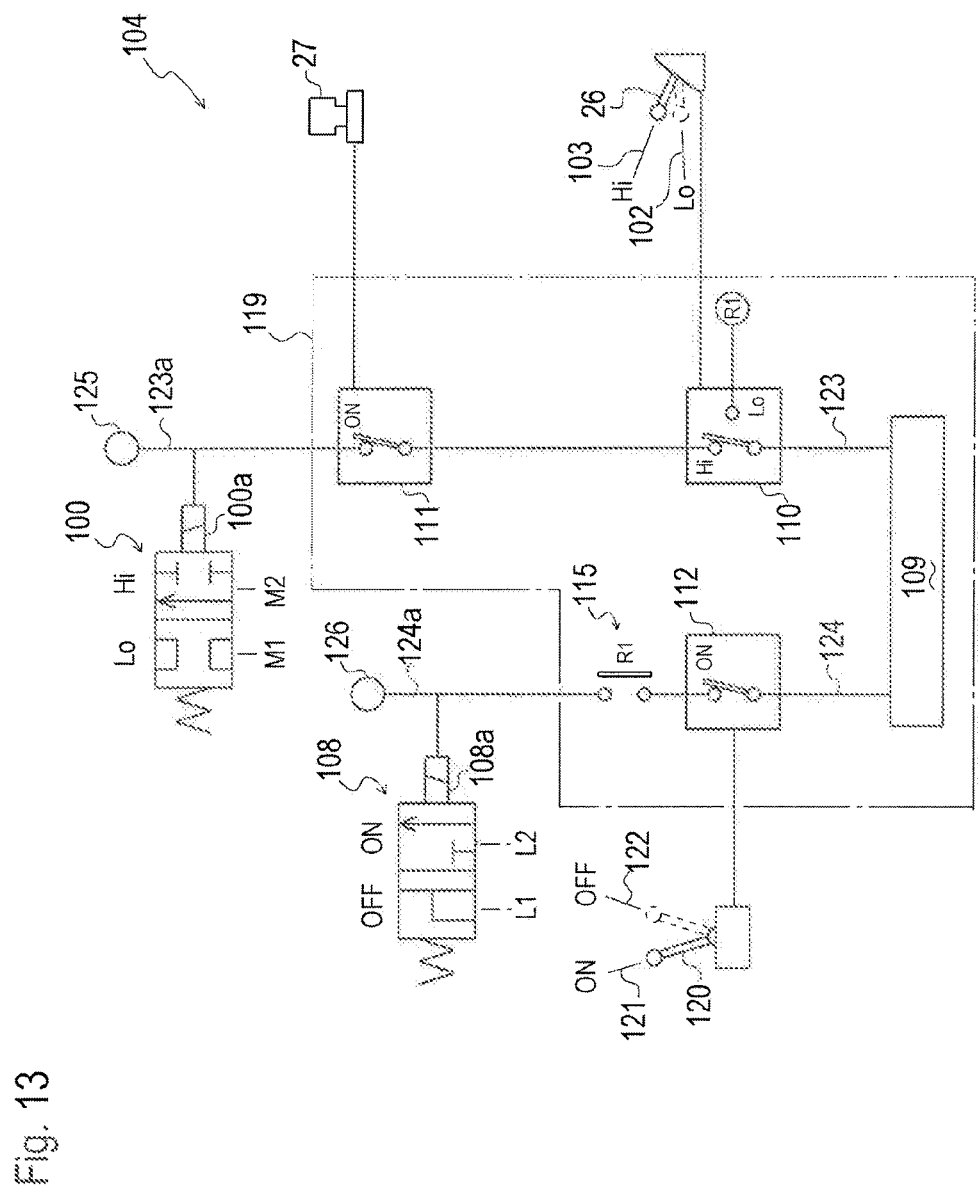
FIG. 13 is a diagram of electric circuits for controlling the vehicle transaxle system, the electric circuits being provided with some checking elements with regard to change of a speed mode of the hydraulic motors.

Referring to FIGS. 9 and 13-17, description will be described of embodiments about traveling-mode control and PTO-clutch control by use of interlocking connection means 66 or 66A. As shown in FIG. 13, a controller 119 is provided for the traveling control and the PTO clutch control. Vehicle 1 is provided with safety control key 27 and speed shift lever 26 as mentioned above, and with a PTO clutch lever 120 for operating PTO clutch 30a. Controller 119 include switches 111, 110 and 112. Switch 111 serves as the above-mentioned key switch having the key slot for safety control key 27. Switch 110 is connected to speed shift lever 26, and switch 112 is connected to PTO clutch lever 120. In this way, switches 111, 110 and 112 are switchable according to operation of respective operation devices 27, 26 and 120. Further, controller 119 includes an "a"-contact type relay 115, and an electric power source 109 such as a battery.

Further, a wire 123 is extended from electric power source 109 to a solenoid 100a of hydraulic motor control valve 100, and a wire 124 is extended from electric power source 109 to a solenoid 108a of PTO clutch valve 108, so as to constitute an electric circuit 104 including wires 123 and 124.

In electric circuit 104, switch 111 serving as the key switch for safety control key 27 and switch 110 connected to speed shift lever 26 are provided in series on wire 123 between electric power source 109 and solenoid 100a. Switch 110 is switched to a high speed position Hi (i.e., switch 110 is closed to establish the continuity of wire 123) by setting speed shift lever 26 at high speed position 103, and is switched to a low speed position Lo (i.e., is opened to interrupt the continuity of wire 123) by setting speed shift lever 26 at low speed position 102. Switch 111 is switched on (i.e., is closed to establish the continuity of wire 123) by inserting safety control key 27 into a key slot. Switch 111 is switched off (i.e., is opened to interrupt the continuity of wire 123) by drawing safety control key 27 out of the key slot. Further, a high speed alarm lamp 125 is electrically connected to wire 123 between switch 110 and solenoid 100a via a branching wire 123a.

Figure 14:
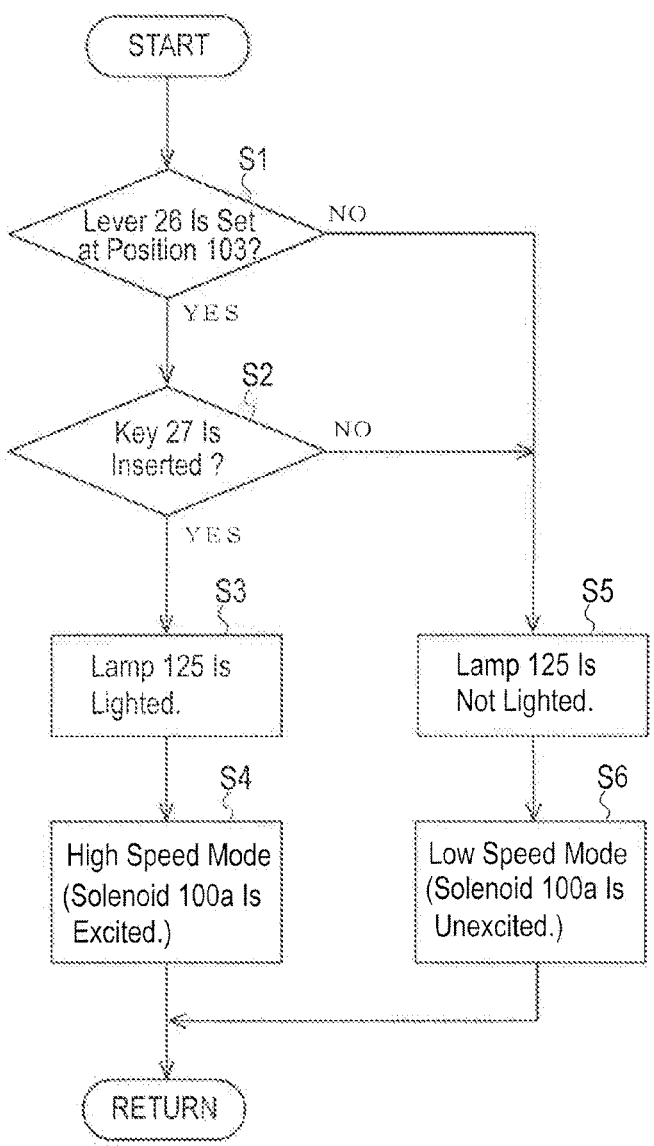
FIG. 14 is a flow chart for limiting the speed mode of the hydraulic motors by use of the electric circuit of FIG. 13.

In this regard, referring to a flow chart shown in FIG. 14, at first, it is judged whether or not speed shift lever 26 is set at high speed position 103 by judging whether switch 110 is set at high speed position Hi or low speed position Lo (Step S1). When switch 110 is set at high speed position Hi by setting speed shift lever 26 at high speed position 103 (Step S1, Yes), it is judged whether or not safety control key 27 is inserted into the key slot by judging whether switch 111 is switched on or off (Step S2). When switch 111 is switched on by inserting safety control key 27 into the key slot (Step S2, Yes), the continuity of wire 123 from electric power source 109 to solenoid 100a and high speed alarm lamp 125 is completed via closed switches 110 and 111, so that high speed alarm lamp 125 is lighted (Step S3), and simultaneously, solenoid 100a is excited to set hydraulic motor control valve 100 at high speed position M2 for supplying fluid to cylinder 98 (or 106) of interlocking connecting means 66 (or 66A) so as to set hydraulic motors 37 in a high speed mode (Step S4), where motor control arm 84 and shafts 86 are set at respective high speed positions A2. Then, the rotary directions and speeds of right and left axles 5R and 5L (i.e., wheels 6R and 6L) are controlled by operating right and left traveling control levers 12R and 12L while hydraulic motors 37 of right and left transaxle units 4R and 4L are set in the high speed mode.

In this way, hydraulic motors 37 are set in the high speed mode only when speed shift lever 26 is set at high speed position 103 and safety control key 27 is inserted into the key slot. Otherwise, i.e., if speed shift lever 26 is set at low speed position 102 to set switch 110 at low speed position Lo (Step S1, No), or if speed shift lever 26 is set at high speed position 103 to set switch 110 at high speed position Hi (Step S1, Yes) and safety control key 27 is removed from the key slot to open switch 111 (Step S2, No), the continuity of wire 123 is interrupted, so that high speed alarm lamp 125 is not lighted (Step S5), and solenoid 100a is unexcited to set hydraulic motor control valve 100 at low speed position M1 for stopping the fluid supply to cylinder 98 (or 106) of interlocking connecting means 66 (or 66A), whereby hydraulic motors 37 are set in a low speed mode (Step S6) so that motor control arms 84 and shafts 86 are set at respective low speed positions A1. Then, the rotary directions and speeds of right and left axles 5R and 5L (i.e., wheels 6R and 6L) are controlled by operating right and left traveling control levers 12R and 12L while hydraulic motors 37 of right and left transaxle units 4R and 4L are set in the low speed mode.

As an effect of this traveling mode control, even if an operator is unaccustomed to traveling speed control operation of vehicle 1 and wrongly shifts speed shift lever 26 to high speed position 103, hydraulic motors 37 are safely kept in the low speed mode unless safety control key 27 is inserted into the key slot.

In electric circuit 104, switch 112 connected to PTO clutch lever 120 and relay 115 are provided in series on wire 124 between electric power source 109 and solenoid 108a. Switch 112 is switched on (i.e., switch 112 is closed to establish the continuity of wire 124) by setting PTO clutch lever 120 at a clutch-on position 121, and is switched off (i.e., switch 112 is opened to interrupt the continuity of wire 124) by setting PTO clutch lever 120 at a clutch-off position 122. When switch 111 is set at low speed position Lo by setting speed shift lever 26 at low speed position 102, a relay coil R1 is supplied with electric current from electric power source 109 via switch 111 set at low speed position Lo, so as to close relay 115 (to establish the continuity of wire 124). When switch 111 is set at high speed position Hi by setting speed shift lever 26 at high speed position 103, relay coil R1 is not supplied with electric current from electric power source 109, thereby opening relay 115 (to interrupt the continuity of wire 124). Further, a PTO clutch-on alarm lamp 126 is electrically connected to wire 124 between relay 115 and solenoid 108a via a branching wire 124a.

Figure 15:
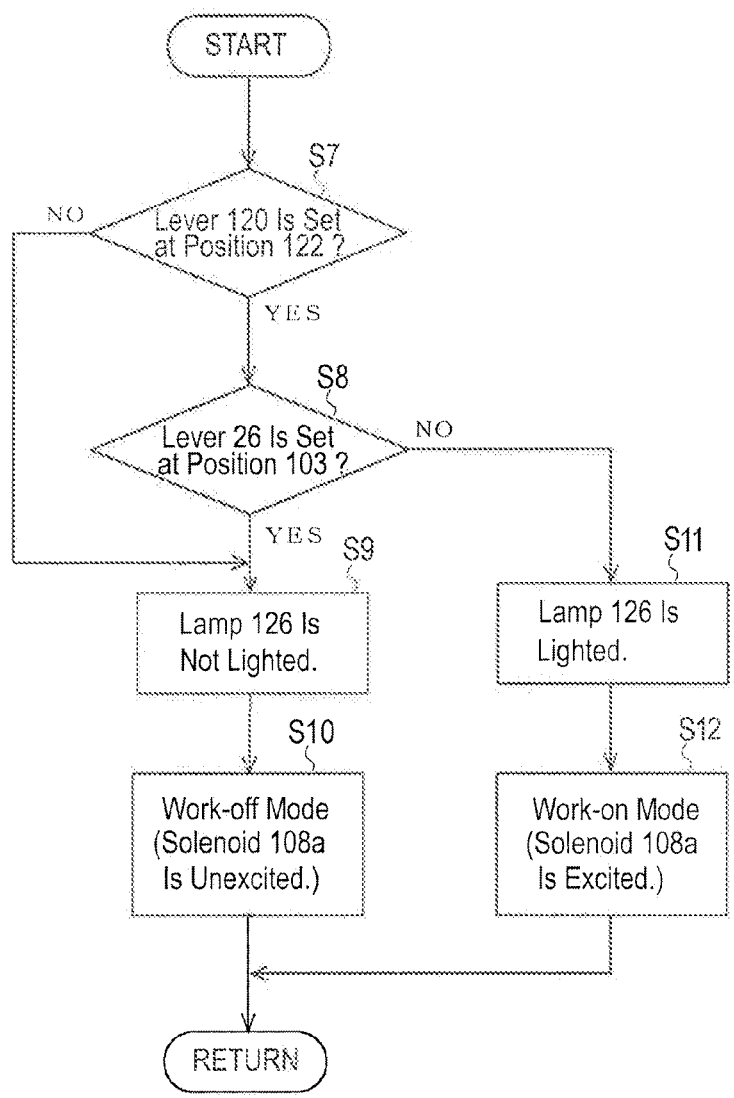
FIG. 15 is a flow chart for controlling a PTO clutch in association with the change of the speed mode of the hydraulic motors by use of the electric circuits of FIG. 13.

In this regard, referring to a flow chart shown in FIG. 15, at first, it is judged whether or not PTO clutch lever 120 is set at clutch-on position 121 by judging whether switch 112 is switched on or off (Step S7). When switch 112 is switched on by setting PTO clutch lever 120 at clutch-on position 121 (Step S7, Yes), it is judged whether or not speed shift lever 26 is set at high speed position 103 by judging whether switch 110 is set at high speed position Hi or low speed position Lo (Step S8). When switch 110 is set at high speed position Hi by setting speed shift lever 26 at high speed position 103 (Step S8, Yes), relay 115 is opened to interrupt the continuity of wire 124, so that PTO clutch-on alarm lamp 126 is not lighted (Step S9), and solenoid 108a is unexcited to set PTO clutch control valve 108 at a clutch-off position L1 for stopping the fluid supply to PTO clutch 30a, thereby disengaging PTO clutch 30a and stopping the driving rotation of rotary blades 20 of mower unit 7. In this way, unless speed shift lever 26 is set at low speed position 102, vehicle 1 is set in a work-off mode (Step S10), wherein the disengagement of PTO clutch 30a is kept to prevent blades 20 from being driven regardless of whether PTO clutch lever 120 is set at clutch-on position 121 or clutch-off position 122.

When switch 112 is switched on by setting PTO clutch lever 120 at clutch-on position 121 (Step S7, Yes) and switch 110 is set at low speed position Lo by setting speed shift lever 26 at low speed position 102 (Step S8, No), relay 115 is closed to complete the continuity of wire 124, so that PTO clutch-on alarm lamp 126 is lighted (Step S11), and simultaneously, solenoid 108a is excited to set PTO clutch control valve 108 at a clutch-on position L2 for supplying fluid to PTO clutch 30a, thereby engaging PTO clutch 30a for driving rotary blades 20 of mower unit 7. In this way, when speed shift lever 26 is set at low speed position 102, vehicle 1 is set in a work-on mode (Step S12), wherein PTO clutch 30a is engaged to allow the driving of blades 20 according to the setting of PTO clutch lever 120 at clutch-on position 121. In other words, the work by working vehicle 1 (in this embodiment, driving of blades 20 of mower unit 7) is allowed only when hydraulic motors 37 are set in the low speed mode.

An effect of this PTO control, if an operator unexpectedly shifts speed shift lever 26 to high speed position 103 while inserting safety control key 27 in the key slot, relay 115 is opened and PTO clutch 30a is disengaged so as to prevent blades 20 from being driven during unexpected high speed traveling of vehicle 1, thereby ensuring the required sure lawn-mowing. Further, if an operator wishes to move vehicle 1 from one work area to another work area and shifts speed shift lever 26 to high speed position 103 for the movement of vehicle 1, PTO clutch 30a is automatically disengaged to prevent blades 20 from being wastefully driven during the movement of vehicle 1, thereby reducing the operator's trouble in operating manipulators.

Figure 16:
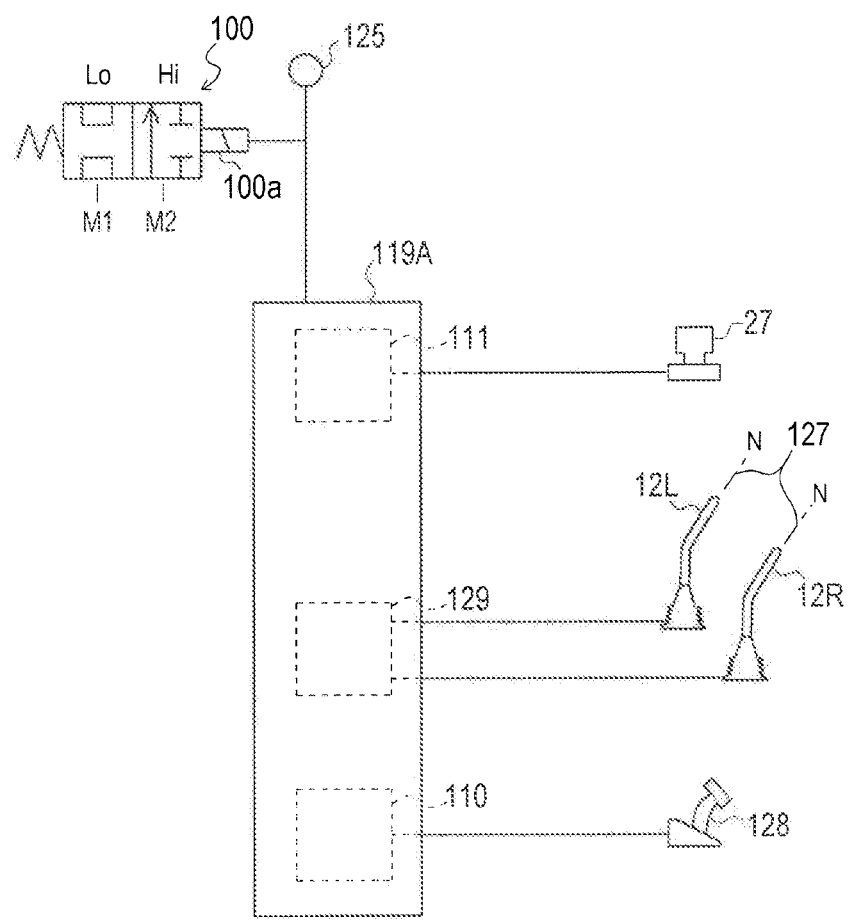
FIG. 16 is a block diagram of an alternative control system for controlling the vehicle transaxle system, the control system being provided with some checking elements with regard to the change of the speed mode of the hydraulic motors.
Figure 17:
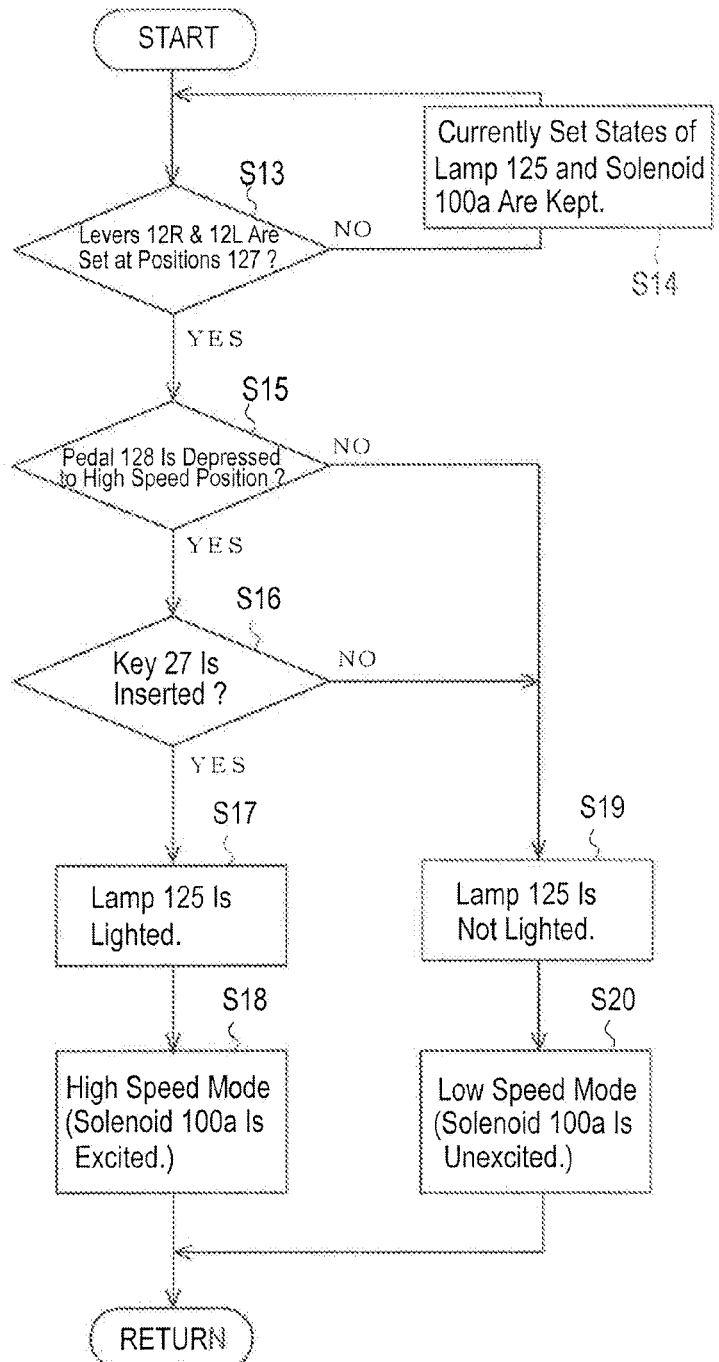
FIG. 17 is a flow chart for limiting the change of the speed mode of the hydraulic motors in association with operation for controlling hydraulic pumps by use of the electric circuit of FIG. 16.

Referring to FIGS. 16 and 17, description will be given of a traveling mode control for allowing hydraulic motors 37 to be shifted into the high speed mode only when both right and left traveling control levers 12R and 12L are set at respective neutral positions 127. In this regard, vehicle 1 is provided with a speed shift pedal 128 instead of speed shift lever 26. Speed shift pedal 128 is selectively undepressed at a low speed pedal position or depressed to a high speed pedal position. This traveling mode control is advantageous for vehicle 1 having speed shift pedal 128 because it prevents hydraulic motors 37 from being unexpectedly shifted into the high speed mode by accidental depression of speed shift pedal 128 to its high speed position.

As shown in FIG. 16, a controller 119A is provided for this traveling mode control. Controller 119A includes switches 110, 129 and 111. Electric power source 109, hydraulic motor control valve 100 with solenoid 100a, and high speed alarm lamp 125 are omitted in FIG. 16. Similar to switch 110 connected to speed shift lever 26, switch 110 in controller 119A is operatively connected to speed shift pedal 128 so as to be selectively set at low speed position Lo according to the undepression of speed shift pedal 128 at the low speed pedal position or set at high speed position Hi according to the depression of speed shift pedal 128 to the high speed pedal position. Switch 111 is switched on or off depending on whether or not safety control key 27 is inserted into the key slot, as mentioned above. Switch 129 is operatively connected to traveling control levers 12R and 12L so as to be switched on or off depending on whether or not both traveling control levers 12R and 12L are set at respective neutral positions 127.

An electric circuit for lighting or not-lighting high speed alarm lamp 125 and for exciting or unexciting solenoid 100a of hydraulic motor control valve 100 is configured in connection with electric power source 109 and switches 110, 129 and 111 in controller 119A, so as to allow the high/low speed mode shift of hydraulic motors 37 according to depression/undepression operation of speed shift pedal 128 only when traveling control levers 12R and 12L are set at respective neutral positions 127. That is, the electric circuit is configured to perform the traveling mode control shown in FIG. 17 described as follows.

Referring to a flow chart shown in FIG. 17, at first, it is judged whether or not both traveling control levers 12R and 12L are set at respective neutral positions 127 by judging whether switch 129 is switched on or off (Step S13). When switch 129 is switched on by setting both traveling control levers 12R and 12L at respective neutral positions 127 (Step S13, Yes), it is judged whether or not speed shift pedal 128 is depressed to the high speed position by judging whether or not switch 110 is set at high speed position Hi (Step S15). When switch 110 is set at high speed position Hi by depressing speed shift pedal 128 to the high speed pedal position (Step S15, Yes), it is judged whether or not safety control key 27 is inserted into the key slot (Step S16) by judging whether switch 111 is switched on or off. When switch 111 is switched on by inserting safety control key 27 in the key slot (Step S16, Yes), high speed alarm lamp 125 is lighted (Step S17), and solenoid 100a is excited to set hydraulic motor control valve 100 at high speed position M2 so as to set hydraulic motors 37 in the high speed mode (Step S18) via interlocking connection mechanism 66 or 66A.

During the setting of both traveling control levers 12R and 12L at respective neutral positions 127, if switch 110 is set at low speed position Lo by setting speed shift pedal 128 is undepressed at the low speed pedal position (Step S15, No), or if safety control key 27 is not inserted in the key slot (Step S16, No), high speed alarm lamp 125 is not lighted (Step S19), and solenoid 100a is unexcited to set hydraulic motor control valve 100 at low speed position M1 so as to set hydraulic motors 37 in the low speed mode (Step S20) via interlocking connection mechanism 66 or 66A.

Unless both traveling control levers 12R and 12L are set at respective neutral positions 127 (Step S13, No), i.e., while vehicle 1 travels by driving at least one of hydraulic motors 37, the currently set excited or unexcited state of solenoid 100a of hydraulic motor control valve 100 is held so as to keep the currently set high or low speed mode of hydraulic motors 37 (Step S14) even if speed shift pedal 128 is shifted between the low speed pedal position and the high speed pedal position.

During the traveling of vehicle 1 by driving at least one of hydraulic motors 37, it may happen that hydraulic motors 37 are set in the low speed mode while speed shift pedal 128 is depressed to the high speed pedal position or that hydraulic motors 37 are set in the high speed mode while speed shift pedal 128 is undepressed at the low speed pedal position. However, as soon as both traveling control levers 12R and 12L reach respective neutral positions 127 (Step S13, Yes), the state of solenoid 100a of hydraulic motor control valve 100 is changed to correspond to the state of switch 110 (on the assumption that safety control key 27 is inserted in the key slot), so that the speed mode of hydraulic motors 37 having disagreed with the pedal position of speed shift pedal 128 becomes correspondent to the pedal position of speed shift pedal 128 (Step S18 or S20).

During the setting of both traveling control levers 12R and 12L at respective neutral positions 127, even if speed shift pedal 128 is still disposed at an unexpected pedal position, both hydraulic pumps 36 are set in respective neutral states so that the shift of speed mode of hydraulic motors 37 does not cause sudden traveling speed change of vehicle 1, and high speed alarm lamp 125 is lighted or not-lighted simultaneously to the change of the solenoid state of hydraulic motor control valve 100 (Step S17 or S19) so that an operator becomes aware of the need to correct the pedal position of speed shift pedal 128 before the operator starts rotating at least one of speed control levers 12R and 12L from neutral position 127. Therefore, vehicle 1 is prevented from being unexpectedly speed-changed by changing the speed mode of hydraulic motors 37.

An alternative interlocking connection means 140 shown in FIG. 18 will be described. Interlocking connection means 140 includes a pair of motor control units 141R and 141L configured identical to each other. Motor control unit 141R is provided for rotating motor control arm 84 of hydraulic motor 37 of right transaxle unit 4R, and motor control unit 141L is provided for rotating motor control arm 84 of hydraulic motor 37 of left transaxle unit 4L.

Each of motor control units 141R and 141L includes a deceleration gearbox 143 and an electric motor 142 (serving as a rotary type actuator) attached to deceleration gearbox 143. Electric motor 142 has an output element whose rotary direction is reversible. Deceleration gearbox 143 incorporates a deceleration gear train which transmits power from the output element of electric motor 142 to an operation arm 144 (serving as a rotatable operation member) pivoted on deceleration gearbox 143. An alternative deceleration drive train without gears may be provided for transmitting power from the output element of electric motor 142 to operation arm 144. Operation arm 144 is rotated in one of opposite directions depending on either one or the other rotary direction of the output element of electric motor 142. A link rod 145 is pivotally connected at one end thereof to a tip of operation arm 144, and is pivotally connected at the other end thereof to the tip of motor control arm 84 (serving as a rotatable operation member).

Figure 18:
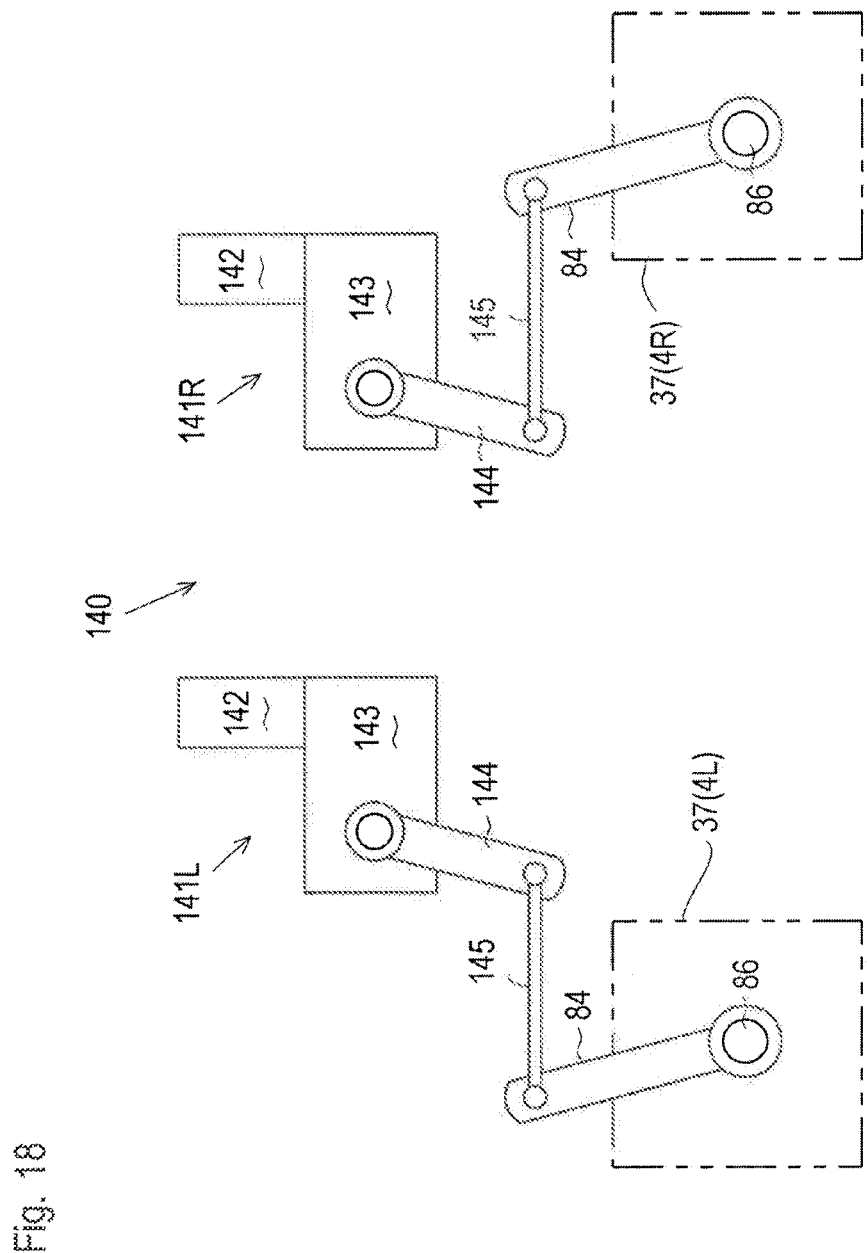
FIG. 18 is a diagram of a third interlocking connection means.

Interlocking connection means 140 shown in FIG. 18 includes an electric circuit (not shown) for controlling electric motors 142 of respective motor control units 141R and 141L so as to synchronously rotate both operation arms 144, thereby synchronously operating motor control arms 84 of both transaxle units 4R and 4L. Interlocking connection means 140 may be provided with sensors for detecting respective positions and rotational speeds of motor control arms 84 (or operation arms 144), thereby providing feedback for controlling electric motors 142.

Figure 19:
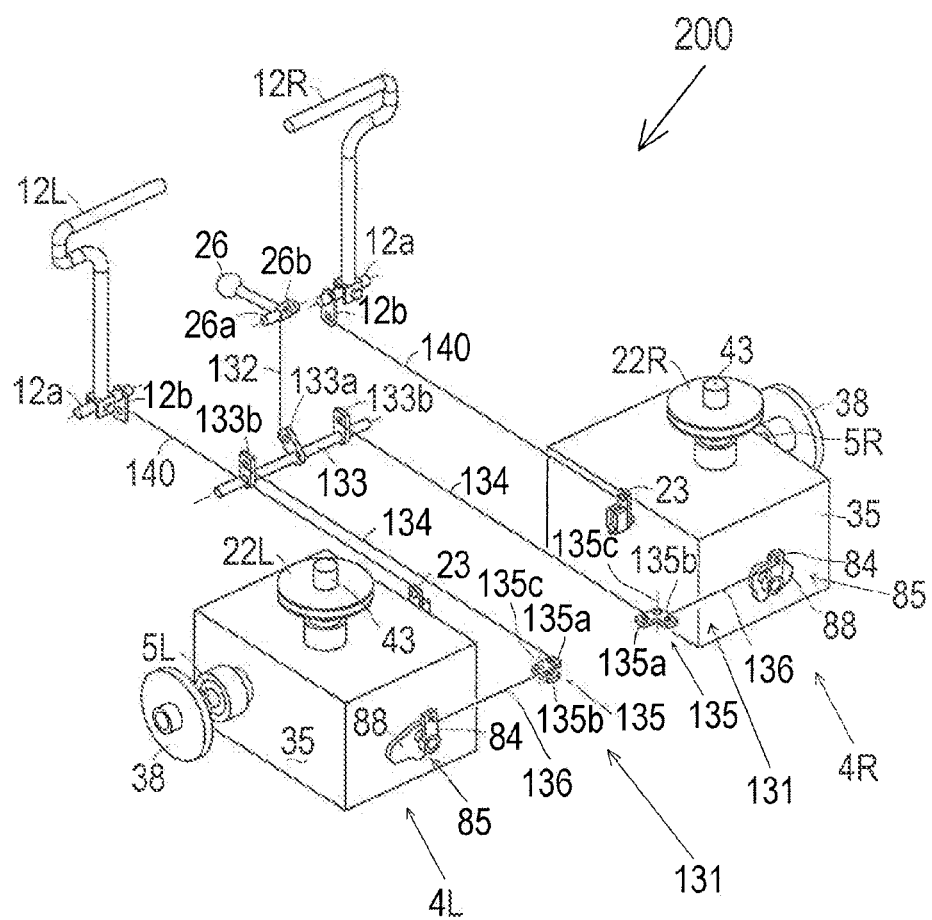
FIG. 19 is a perspective view of an operation system configured to achieve the hydraulic circuit system of FIG. 12.

An operation system 200 for achieving the vehicle transaxle system shown in FIG. 12 will be described with reference to FIG. 19. FIG. 19 is a perspective view of an operation system configured to achieve the hydraulic circuit system of FIG. 12, wherein right and left pump controlling manipulators are used for individually controlling the hydraulic pumps of the right and left transaxle units, and wherein a motor controlling manipulator is used for simultaneously controlling the hydraulic motors of the right and left transaxle units. Right and left raveling control levers 12R and 12L are juxtaposed in vehicle 1 as mentioned above so that traveling control levers 12R and 12L serve as right and left pump controlling manipulators for individually controlling fluid delivery amounts and directions of hydraulic pumps 36 of respective right and left transaxle units 4R and 4L. Each of traveling control levers 12R and 12L is joined at a basal end thereof to a laterally horizontal axial pivot shaft 12a, and an arm 12b is fixed on pivot shaft 12a so that each of traveling control levers 12R and 12L is rotatable together with its arm 12b centered on the lateral horizontal axis of its pivot shaft 12a.

Assuming that a side closer to the lateral center of vehicle 1 between right and left transaxle units 4R and 4L is referred to as "laterally proximal" and a side farther from the lateral center of vehicle 1 is referred to as "laterally distal" (hereinafter, "laterally proximal" and "laterally distal" are referred to on the same assumption), right and left transaxle units 4R and 4L have respective pump control arms 22 on laterally proximal sides of their transaxle casings 35 while right and left axles 5R and 5L project outward from laterally distal sides of respective transaxle casings 35. In other words, right transaxle unit 4R has pump control arm 23 on a left side of its transaxle casing 35 while right axle 5R projects rightward from a right side of transaxle casing 35 of right transaxle unit 4R. Left transaxle unit 4L has pump control arm 23 on a right side of its transaxle casing 35 while left axle 5L projects leftward from a left side of transaxle casing 35 of left transaxle unit 4L. Incidentally, FIG. 19 (and later-discussed FIG. 22) simply illustrates transaxle casings 35 of right and left transaxle units 4R and 4L as simple rectangular boxes, while shapes of transaxle casings 35 are actually more complicated. Due to the lateral horizontal axis of each pump control shaft 80 (see FIG. 5) on which pump control arm 23 is provided, each pump control arm 23 is rotatable in the fore-and-aft direction of vehicle 1 (perpendicular to axles 5R and 5L).

Each of right and left link members 140, e.g., rods or wires, is pivotally joined at one (in this embodiment, front) end thereof to a fore-and-aft rotatable end portion of arm 12b of corresponding traveling control lever 12R or 12L, and is pivotally joined at the other (in this embodiment, rear) end thereof to a fore-and-aft rotatable end portion of pump control arm 23 of corresponding transaxle unit 4R or 4L. Link members 140 are extended from respective traveling control levers 12R and 12L to respective transaxle units 4R and 4L in the fore-and-aft direction of vehicle 1 along the lateral proximal sides of transaxle casings 35 of transaxle units 4R and 4L. In other words, link member 140 from right traveling control lever 12R is extended along the left side of transaxle casing 35 of right transaxle unit 4R, and link member 140 from left right traveling control lever 12L is extended along the right side of transaxle casing 35 of left transaxle unit 4L.

Therefore, when each of right and left traveling control levers 12R and 12L is rotated in the fore-and-aft direction of vehicle 1 so as to decide the rotational direction and speed of corresponding axle 5R or 5L, corresponding link member 140 is pushed or pulled forward or rearward so as to rotate corresponding pump control arm 23, thereby controlling swash plate 41 of corresponding transaxle unit 4R or 4L so as to realize the decided rotational direction and speed of corresponding axle 5R or 5L.

Incidentally, pump control arm 23 and link member 140 (and a later-discussed link member 132) are disposed on the laterally proximal side of transaxle casing 35 so as to be prevented from interfering with axle 5R or 5L projecting outward from the laterally distal side of transaxle casing 35. However, pump control arm 23 and link member 140 (and link member 132) may be disposed on the laterally distal side of transaxle casing 35 if they are prevented from interfering with axle 5R or 5L or the laterally distal side of transaxle casing 35 is convenient for arranging them.

Speed shift lever 26 is operatively connected to motor control levers 84 via mechanical connection members 131 as mentioned above with reference to FIG. 12. In this regard, speed shift lever 26 is disposed in vehicle 1 between right and left traveling control levers 12R and 12L in the lateral direction of vehicle 1 so as to serve as a motor controlling manipulator for simultaneously controlling displacements of hydraulic motors 37 of both right and left transaxle unit 4R or 4L. Speed shift lever 26 is joined at a basal end thereof to a laterally horizontal axial pivot shaft 26a, and an arm 26b is fixed on pivot shaft 26a. A laterally horizontal axial pivot shaft 133 is extended parallel to pivot shaft 26a. In this embodiment, pivot shaft 133 is disposed below pivot shaft 26a of speed shift lever 26. Three arms 133a and 133b are fixed on pivot shaft 133. Arm 133a is disposed between right and left arms 133b so that right and left arms 133b are symmetric with respect to arm 133a. A link member 132, e.g., a rod or a wire, is extended (in this embodiment, downward) to connect arm 26b to arm 133a so that pivot shaft 133 is rotatably centered on its own laterally horizontal axis according to the above-mentioned vertical rotation of speed shift lever 26 between low speed position 102 and high speed position 103 (see FIG. 1).

On the other hand, right and left transaxle units 4R and 4L have respective motor control arms 84 on front or rear sides (in this embodiment, rear sides) of their transaxle casings 35 so that motor control arms 84 of right and left transaxle units 4R and 4L are rotatable in the lateral direction of vehicle 1 (parallel to axles 5R and 5L) centered on fore-and-aft horizontal axes of motor control shafts 86 (see FIG. 3 and others) of respective right and left transaxle units 4R and 4L. In this embodiment, right and left transaxle units 4R and 4L are configured laterally symmetric so that motor control arms 84 of right and left transaxle units 4R and 4L are rotated laterally symmetrically (i.e., laterally opposite each other) to simultaneously decide either the high or low speed level of both right and left axles 5R and 5L. For example, when speed shift lever 26 is shifted to low speed position 102, motor control arm 84 of right transaxle unit 4R rotates leftward, and simultaneously motor control arm 84 of left transaxle unit 4L rotates rightward, thereby setting both motor swash plates 42 of right and left transaxle units 4R and 4L at their maximum tilt angles (maximum motor displacement positions). When speed shift lever 26 is shifted to high speed position 103, motor control arm 84 of right transaxle unit 4R rotates rightward, and simultaneously motor control arm 84 of left transaxle unit 4L rotates leftward, thereby setting both motor swash plates 42 of right and left transaxle units 4R and 4L at their minimum tilt angles (minimum motor displacement positions).

In this regard, a bell crank 135 is disposed adjacent to a corner of transaxle casing 35 of each of right and left transaxle units 4R and 4L between the laterally proximal side of transaxle casing 35 and the front or rear (in this embodiment, rear) side of transaxle casing 35. Each bell crank 135 is pivoted on a vertical axis and is formed in an L-shape having a lateral extension portion 135a and a fore-and-aft extension portion 135b. In this embodiment, lateral extension portion 135a is extended laterally from the vertical pivot axis of bell crank 135 toward partner transaxle unit 4R or 4L. In other words, bell crank 135 of right transaxle unit 4R has lateral extension portion 135a extended leftward from the vertical pivot axis thereof and bell crank of left transaxle unit 4L has lateral extension portion 135a extended rightward from the vertical pivot axis thereof. Fore-and-aft extension portion 135b of each bell crank 135 is extended rearward from the vertical pivot axis of bell crank 135. Therefore, lateral extension portion 135a of each bell crank 135 has a fore-and-aft rotatable right or left end opposite the vertical pivot axis of bell crank 135, and fore-and-aft extension portion 135b of each bell crank 135 has a laterally rotatable rear end opposite to the vertical pivot axis of bell crank 135.

Each of right and left link members 134, e.g., rods or wires, is pivotally joined at one (in this embodiment, front) end thereof to a fore-and-aft rotatable end portion of each of right and left arms 133b, and is pivotally joined at the other (in this embodiment, rear) end thereof to the fore-and-aft rotatable end of lateral extension portion 135a of bell crank 135 of corresponding transaxle unit 4R or 4L. Link members 134 are extended from respective arms 133b to lateral extension portions 135a of bell cranks 135 of respective transaxle units 4R and 4L in the fore-and-aft direction of vehicle 1 along the lateral proximal sides of transaxle casings 35 of transaxle units 4R and 4L. In other words, link member 134 from right arm 133b is extended along the left side of transaxle casing 35 of right transaxle unit 4R, and link member 134 from left arm 133b is extended along the right side of transaxle casing 35 of left transaxle unit 4L.

Each of right and left link members 136, e.g., rods or wires, is pivotally joined at its laterally proximal end thereof to the laterally rotatable end of fore-and-aft extension portion 135b of each bell crank 135, and is pivotally joined at the other laterally distal end thereof to the laterally rotatable end of motor control arm 84 of corresponding transaxle unit 4R or 4L. Link members 136 are extended from respective fore-and-aft extension portions 135b of bell cranks 135 of respective transaxle units 4R and 4L to motor control arms 84 of respective transaxle units 4R and 4L in the lateral direction of vehicle 1 along the rear sides of transaxle casings 35 of transaxle units 4R and 4L.

In this way, link member 134, bell crank 135 and link member 136 constitute each mechanical connection member 131 that connects motor control arm 84 of each transaxle unit 4R or 4L to speed shift lever 26 as shown in FIG. 12. Therefore, when speed shift lever 26 is rotated vertically between low speed position 102 and high speed position 103 so as to decide a speed level of both axles 5R and 5L, both link members 134 are simultaneously pushed or pulled forward or rearward so as to rotate lateral extension portions 135a of bell cranks 135, and both link members 136 are simultaneously pushed or pulled rightward and leftward symmetrically so as to simultaneously rotate motor control arms 84 of right and left transaxle units 4R and 4L rightward and leftward symmetrically, thereby rotating controlling motor swash plates 42 of both transaxle units 4R and 4L so as to achieve the decided high or low speed level of both axles 5R and 5L.

Figure 20:
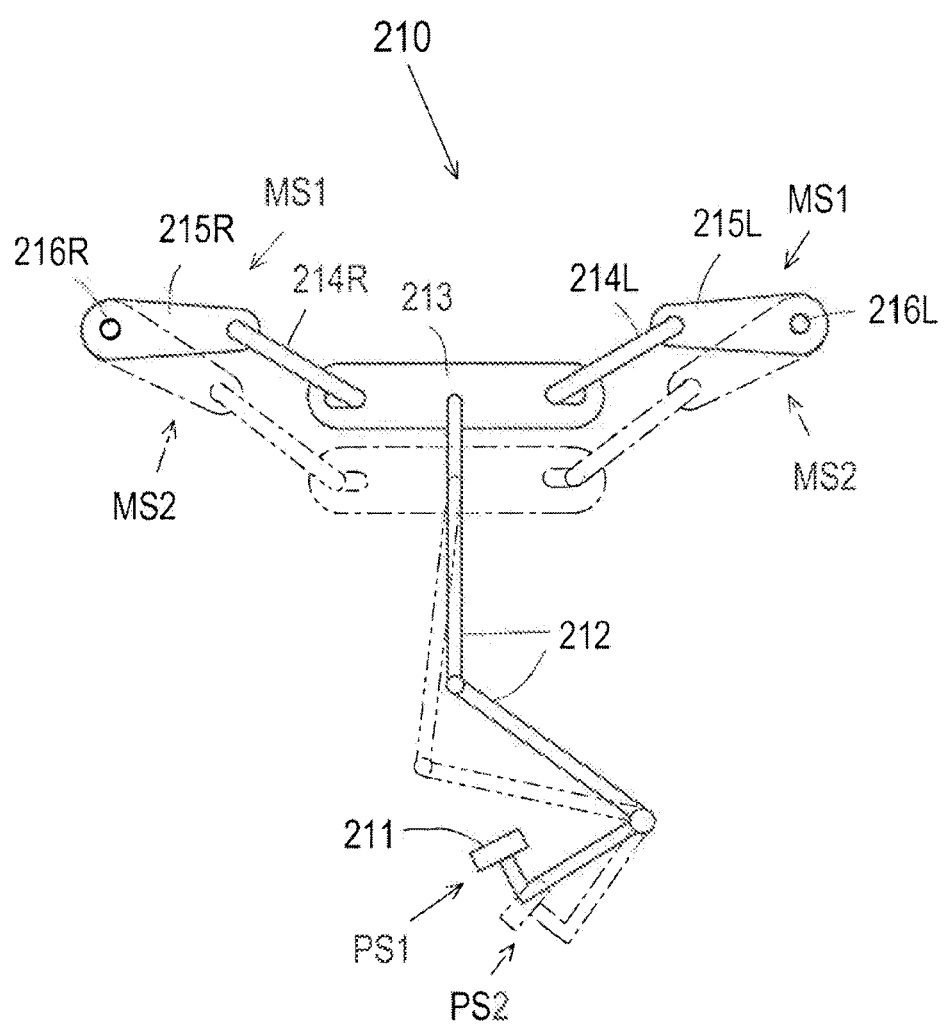
FIG. 20 is a diagram of an operation system for simultaneously shifting both motor swash plates of the right and left transaxle units.

FIG. 20 is a diagram of an operation system for simultaneously shifting both motor swash plates of the right and left transaxle units, configured so as to rotate motor control arms of the right and left transaxle units in opposite directions in the lateral direction of the vehicle by manipulating a motor controlling manipulator. Referring to FIG. 20, an operation system 210 is configured so as to simultaneously shift motor swash plates 42 by manipulating a single motor controlling manipulator. A speed shift pedal 211 serves as the motor controlling manipulator, however, an alternative lever such as speed shift lever 26 may serve as the motor controlling manipulator the same thing is adapted to a later-discussed operation system 220 of FIG. 21). Speed shift pedal 211 is shiftable an undepressed position serving as a low speed position PS1 and a depressed position serving as a high speed position PS2.

In operation system 210, transaxle units 4R and 4L have respective motor control arms 215R and 215L provided on respective motor control shafts 216R and 216L. Motor control shafts 216R and 216L are axial in the fore-and-aft direction of vehicle 1 so that right and left motor control arms 215R and 215L are rotatable in the lateral direction of vehicle 1 (parallel to axles 5R and 5L), and the rotational direction of right motor control arm 215R from its low speed position MS1 defining a large displacement position of corresponding motor swash plate 42 to its high speed position MS2 defining a small displacement position of corresponding motor swash plate 42 is laterally opposite the rotational direction of left motor control arm 215L from its low speed position MS1 to its high speed position MS2, similar to motor control arms 84 of transakle units 4R and 4L in operation system 200 of FIG. 19.

A link 212 is extended from speed shift pedal 211 and is pivotally connected at an end thereof to a middle portion of a connection plate 213. A right connection link rod 214R connects right motor control arm 215R to a right end portion of connection plate 213, and a left connect link rod 214L connects left motor control arm 215L to a left end portion of connection plate 213, whereby connection plate 213 connects right and left motor control arms 215R and 215L to each other so that motor control arms 215R and 215L are simultaneously rotated between their low speed positions MS1 and their high speed positions MS2 according to the shift of speed shift pedal 211 between low speed position PS1 and high speed position PS2.

When speed shift pedal 211 is undepressed so as to be set at low speed position PS1, right and left motor control arms 215R and 215L are set at respective low speed positions MS1. When speed pedal 211 is depressed to high speed position PS2, link 212 moves to pull connection plate 221 so as to simultaneously rotate right and left motor control arms 215R and 215L to respective high speed positions MS2. In this regard, in FIG. 20, the rotation of right motor control arm 215R from low speed position MS1 to high speed position MS2 is clockwise, whereas the rotation of left motor control arm 215L from low speed position MS1 to high speed position MS2 is counterclockwise, i.e., laterally opposite the rotation of right motor control arm 215R. Connection plate 213 translates along with the depression of speed shift pedal 211 and with parallel movement of its right and left ends connected to respective right and left motor control arms 215R and 215L via respective link rods 214R and 214L so as to enable the simultaneous lateral opposite rotation of right and left motor control arms 215R and 215L.

Figure 21:
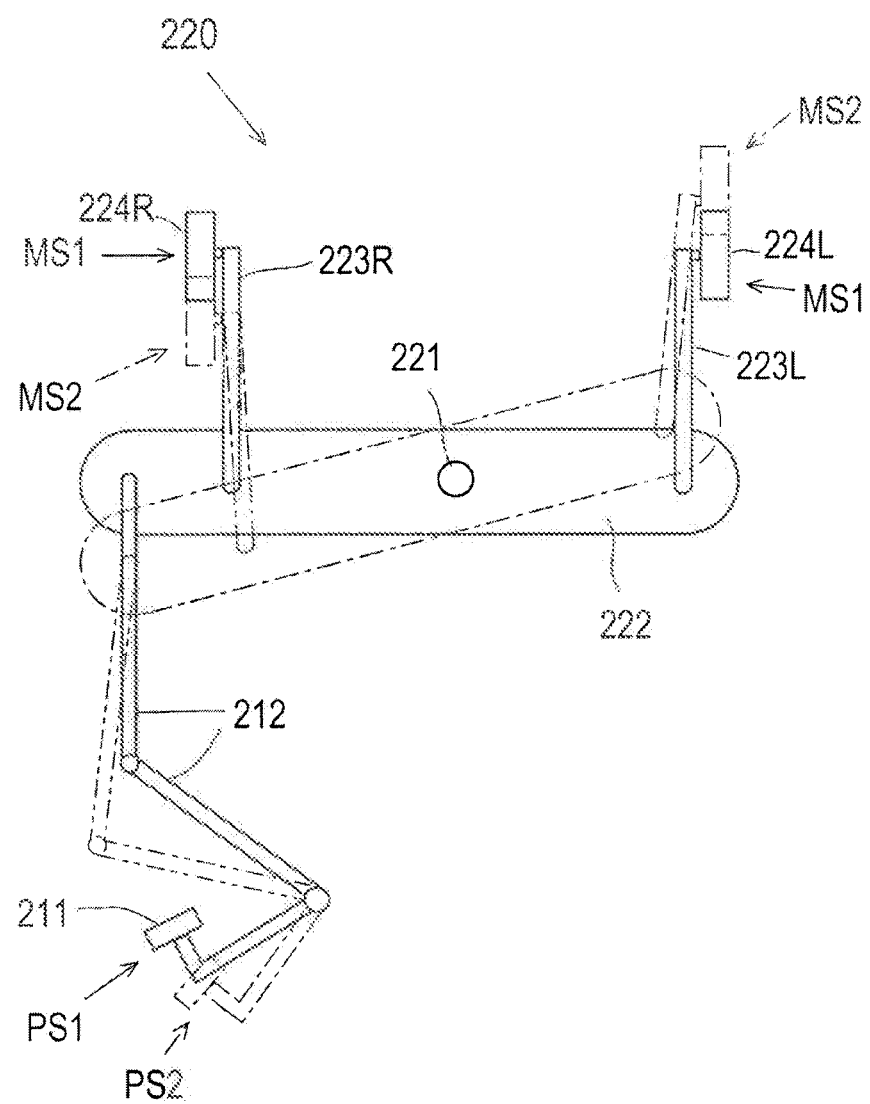
FIG. 21 is a diagram of an operation system for simultaneously shifting both motor swash plates of the right and left transaxle units.

FIG. 21 is a diagram of an operation system for simultaneously shifting both motor swash plates of the right and left transaxle units, configured so as to rotate motor control arms of the right and left transaxle units in opposite directions in the fore-and-aft direction of the vehicle by manipulating a motor controlling manipulator. Referring to FIG. 21, an operation system 220 is also configured so as to simultaneously shift motor swash plates 42 by manipulating speed shift pedal 211 that is shiftable between low speed position PS1 and high speed position PS2. In operation system 220, transaxle units 4R and 4L have respective motor control arms 224R and 224L that are rotatable in the fore-and-aft direction of vehicle 1 (perpendicular to axles 5R and 5L), and the rotational direction of right motor control arm 224R from its low speed position MS1 to its high speed position MS2 is fore-and-aft opposite the rotational direction of left motor control arm 224L from its low speed position MS1 to its high speed position MS2.

A swing plate 222 is pivoted at an intermediate portion thereof on a pivot shaft 221. Right and left link rods 223R and 223L are pivotally connected at one end to right and left portions of swing plate 222 evenly distant from pivot shaft 221, thereby ensuring even rotational degrees of right and left motor control arms 224R and 224L from respective low speed positions MS1 to respective high speed positions MS2. An end portion of swing plate 222 is extended distally from one of the right and left portions connected to link rods 223R and 223L, and the end of link 212 extended from speed shift pedal 211 is pivotally connected to this end portion of swing plate 222. In this embodiment, the rotational direction of right motor control arm 224R from its low speed position MS1 to its high speed position MS2 is forward, whereas the rotational direction of left motor control arm 224R from its low speed position MS1 to its high speed position MS2 is rearward. Therefore, in this embodiment, the end portion of swing plate 222 pivotally connected to link 212 is the right end portion of swing plate 222 so as to agree with the forward movement of link 212 during the shift of speed shift pedal 211 from low speed position PS1 to high speed position PS2.

When speed shift pedal 211 is undepressed so as to be set at low speed position PS1, right and left motor control arms 223R and 223L are set at respective low speed positions MS1. When speed pedal 211 is depressed to high speed position PS2, link 212 moves to pull the right end portion of swing plate 222 forward so as to rotate right motor control arm 224R forward to its high speed position MS2 via right link rod 223R, so that swing plate 222 rotates centered on pivot shaft 221 so as to move the left portion thereof rearward, thereby rotating left motor control arm 224L rearward to its high speed position MS2 via left link rod 223L simultaneously to the forward rotation of right motor control arm 224R to its high speed position MS2.

Each of above-mentioned operation systems 200, 210 and 220 of FIGS. 19, 20 and 21 for controlling right and left transaxle units 4R and 4L in the transaxle system of FIG. 12 is adaptable so that the manipulation of speed shift lever 26 or speed shift pedal 211 for controlling both motor swash plates 42 for deciding the speed level of both axles 5R and 5L is independent of the manipulation of traveling control levers 12R and 12L for controlling respective pump swash plates 41 for deciding the rotary speeds and directions of respective axles 5R and 5L. In other words, the rotary speeds and directions of respective axles 5R and 5L are changeable independently by independent manipulation of right and left traveling control levers 12R and 12L serving as the right and left pump controlling manipulators while speed shift lever 26 or speed shift pedal 211 serving as the motor controlling manipulator is set at either low speed position 102 or PS1 or high speed position 103 or PS2 so as to select either the high or low speed level of both axles 5R and 5L.

On the contrary, referring to FIGS. 22, 23 and 24A-24D, an alternative operation system 230 for controlling right and left transaxle units 4R and 4L is adaptable on an assumption that only each of traveling control levers 12R and 12L is manipulated to control pump swash plate 41 and motor swash plate 42 of corresponding transaxle unit 4R or 4L. In other words, operation system 230 is adaptable to realize that motor swash plate 42 can be shifted to change the speed level of maximum forward traveling speed of corresponding axle 5R or 5L decided by setting corresponding pump swash plate 41 at its maximum tilt angle as its maximum forward traveling speed position.

In this embodiment, operation system 230 is provided on the assumption that each of transaxle units 4R and 4L has pump control shaft 80 projecting outward from the laterally proximal side of transaxle casing 35 and has motor control shaft 86 projecting rearward from the rear side of transaxle casing 35, similar to operation system 200 of FIG. 19. In operation system 230, two arms 231 and 232 are provided on an outside portion of pump control shaft 80 projecting outward from transaxle casing 35 of each of transaxle units 4R and 4L. Control arm 231 is provided on the outside portion of pump control shaft 80 rotatably relative to pump control shaft 80, and pump control arm 232 is disposed closer to corresponding transaxle casing 35 than control arm 231 and is fixed on the outside portion of pump control shaft 80 rotatably integrally with pump control shaft 80.

A pressure pin 231a projects parallel to pump control shaft 80 from control arm 231 toward transaxle casing 35. A pressure pin 232a projects parallel to pump control shaft 80 from pump control arm 232 toward control arm 231. A spring 233 is coiled around pump control shaft 80 between arms 231 and 232. Both end portions 233a and 233b of spring 233 are twisted to cross each other and are extended to have pressure pins 231a and 232a therebetween. Spring 233 has a spring force to bias both end portions 233a and 233b toward each other so as to nip pressure pins 231a and 232a therebetween.

Link member 140 extended from each of traveling operation levers 12R and 12L has an end (in this embodiment, a rear end) 140a pivotally joined to the fore-and-aft rotatable top end portion of control arm 231. A fore-and-aft rotatable lower end portion of control arm 231 is extended downward from pump control shaft 80 and is formed therein with a slot 231b extended in the fore-and-aft direction of vehicle 1. On the other hand, the laterally rotatable top portion of motor control arm 84 is formed therein with a slot 84a extended in the lateral direction of vehicle 1.

L-shaped bell crank 135 is disposed adjacent to the corner of transaxle casing 35 of each of transaxle units 4R and 4L so that lateral extension portion 135a is extended laterally distally from the vertical pivot axis of bell crank 135 toward motor control arm 84 disposed on the rear side of transaxle casing 35, and fore-and-aft extension portion 135b is extended forward from the vertical pivot axis of bell crank 135. A link member 142 is extended in the fore-and-aft direction of vehicle 1 so as to have a front end 142a fitted in slot 231b of corresponding control arm 231 and so as to have a rear end pivotally joined to the fore-and-aft rotatable end of lateral extension portion 135a of bell crank 135. A link member 143 is extended in the lateral direction of vehicle 1 so as to have one right or left end 143a fitted in slot 84a of corresponding motor control arm 84 and so as to have another end pivotally joined to the laterally rotatable end of fore-and-aft extension portion 135b of bell crank 135. Link member 142, bell crank 135 and link member 143 constitute a linkage 141 between control arm 231 and motor control arm 84.

Figure 22:
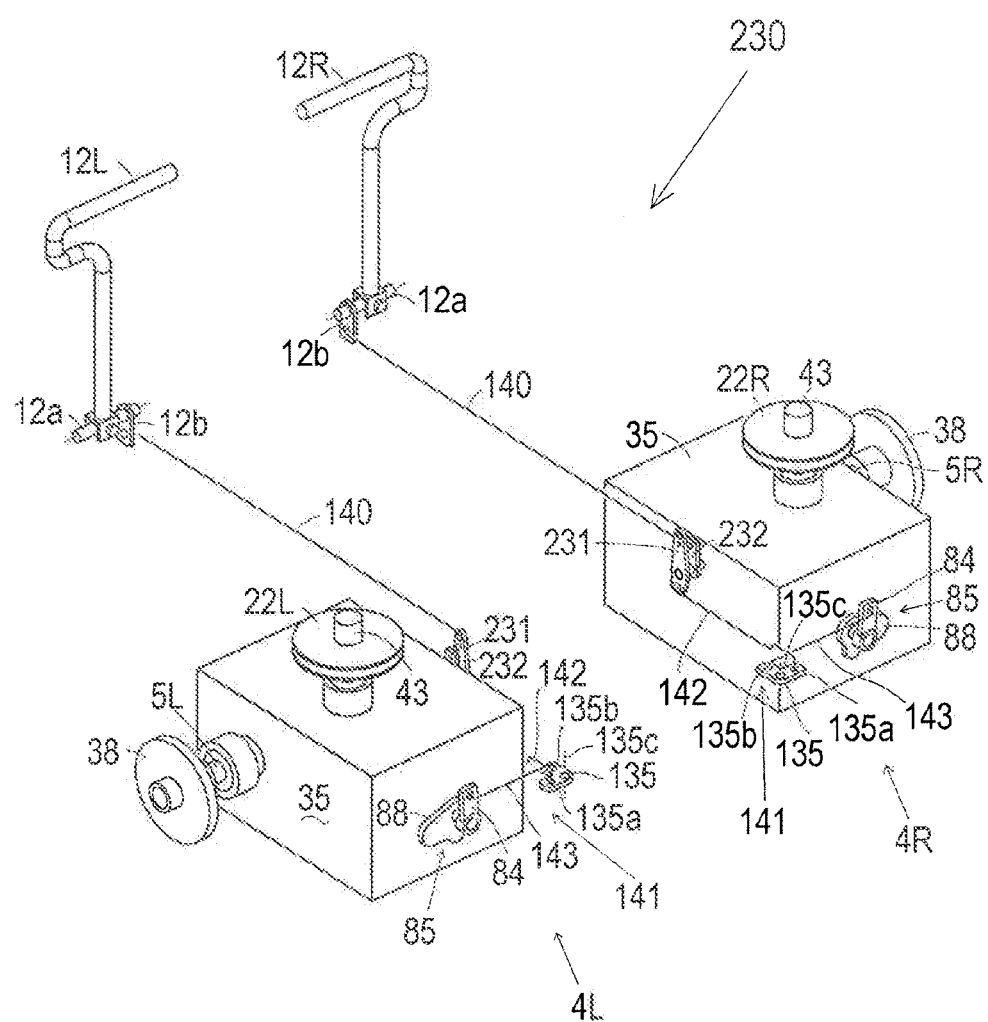
FIG. 22 is a perspective view of an operation system for controlling the hydraulic pumps and motors in the right and left transaxle units by using only right and left manipulators.
Figure 23:
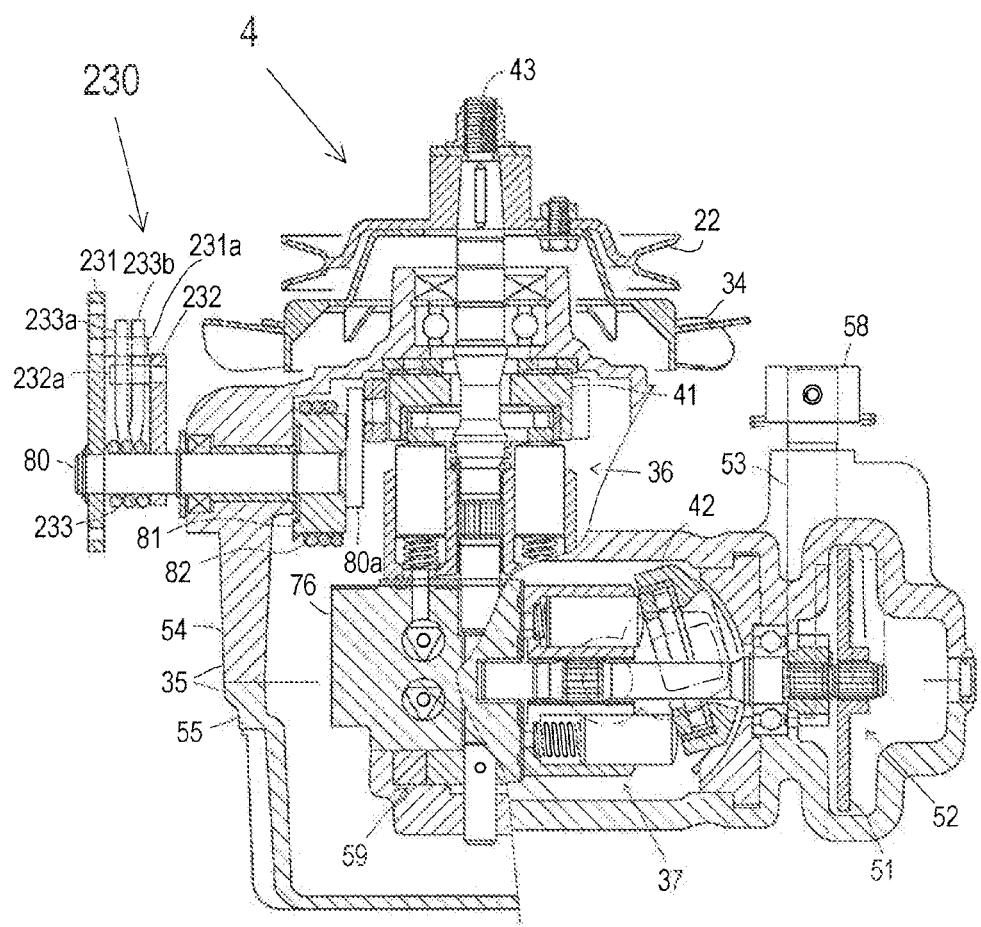
FIG. 23 is a sectional plan view of a representative transaxle unit employing the operation system of FIG. 22.

Operation of operation system 230 shown in FIGS. 22 and 23 will be described with reference to FIG. 24A-24D on an assumption that representative arms 231, 232 and 84 shown in FIGS. 24A-24D are provided on transaxle casing 35 of left transaxle unit 4L operated by left traveling control lever 12L, wherein motor control arm 84 is shiftable between leftward low speed position A1 for defining the maximum tilt angle (maximum displacement position) of corresponding motor swash plate 42 and rightward high speed position A2 for defining the minimum tilt angle (minimum displacement position) of corresponding motor swash plate 42. Incidentally, motor control arm 84 of right transaxle unit 4R is not shown in FIGS. 24A-24D, however, as understood from FIGS. 20 and 21 in view of FIGS. 24A-24D, motor control arm 84 of right transaxle unit 4R controlled by right traveling control lever 12R is shiftable between rightward low speed position A1 for defining the maximum tilt angle (maximum displacement position) of corresponding motor swash plate 42 and leftward high speed position A2 for defining the minimum tilt angle (minimum displacement position) of corresponding motor swash plate 42.

Figure 24A:
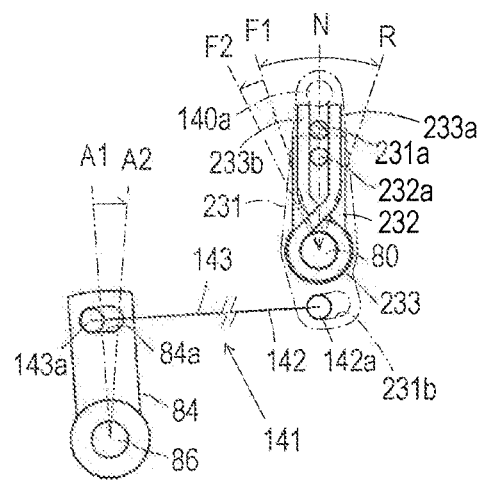
FIG. 24A illustrates arms in the operation system of FIG. 22 when the corresponding manipulator is set at its neutral position.

Referring to FIG. 24A, when traveling control lever 12L is set at its neutral position, control arm 231 connected to traveling control lever 12L via link member 140 is disposed at its neutral position N so as to retain pump control arm 232 at its neutral position N via spring 233, thereby setting pump swash plate 41 at its neutral position. At this time, front end 142a of link member 142 is disposed at a rear end of slot 231b so as to push lateral extension portion 135a of bell crank 135 rearward, thereby pushing fore-and-aft extension portion 135b of bell crank 135 leftward. Therefore, at this time, left end 143a of link member 143 is disposed at a left end of slot 84a so as to push motor control arm 84 leftward so as to retain motor control arm 84 at low speed position A1.

Figure 24B:
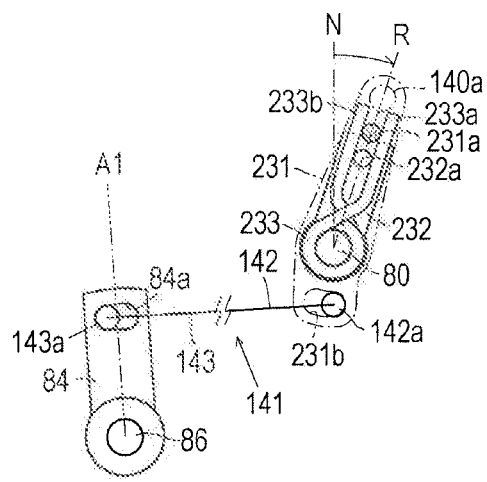
FIG. 24B illustrates the arms when the corresponding manipulator is set at its maximum backward traveling speed position.

Referring to FIG. 24B, when traveling control lever 12L is moved in one direction (in this embodiment, forward) from the neutral position and reaches its maximum backward traveling speed position, control arm 231 connected to traveling control lever 12L via link member 140 is disposed at its maximum backward traveling speed position R so as to retain pump control arm 232 at its maximum backward traveling speed position R via spring 233, thereby setting pump swash plate 41 at its maximum tilt angle for defining the maximum backward traveling rotary speed of axle 5L. Front end 142a of link member 142 is allowed to remain at the position defined by setting motor control arm 84 at low speed position A1, while the lower end portion of control arm 231 with slot 231b rotates rearward until control arm 231 and pump control arm 232 reach their maximum backward traveling speed position R. In other words, slot 231b is set in dimension to allow the forward movement of front end 142a of link member 142 relative to control arm 231 during the rotation of control arm 231 from neutral position N to maximum backward traveling speed position R. Therefore, motor control arm 84 is held at low speed position A1 to keep the low speed level of axle 5L while the backward traveling speed of axle 5L is increased until it reaches its maximum.

Figure 24C:
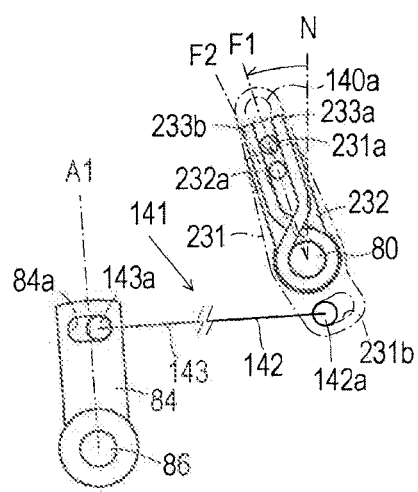
FIG. 24C illustrates the arms when the corresponding manipulator is set at its forward traveling speed position for defining a maximum forward traveling speed of the corresponding axle at a low speed level.

On the other hand, referring to FIG. 24C, when traveling control lever 12L is moved in the other direction (in this embodiment, rearward) from the neutral position and reaches its maximum forward traveling speed position at the low speed level defined by setting motor control arm 84 at low speed position A1, control arm 231 connected to traveling control lever 12L via link member 140 is disposed at a forward traveling speed position F1 of control arm 231 so as to retain pump control arm 232 at a maximum forward traveling speed position F1 of pump control arm 232 via spring 233, thereby setting pump swash plate 41 at its maximum tilt angle for defining the maximum forward traveling rotary speed of axle 5L. The lower end portion of control arm 231 moves forward to pull front end 142a of link member 142 at the rear end of slot 231b forward. The forward movement of front end 142a of link member 142 rotates lateral extension portion 135a of bell crank 135 forward, and rotates fore-and-aft extension portion 135b of bell crank 135 rightward, thereby pulling link member 143 rightward. Motor control arm 84 is allowed to remain at low speed position A1 while left end 143a of link member 143 moves rightward in slot 84a until pump control arm 232 reaches its maximum forward traveling speed position F1. In other words, slot 84a is set in dimension to allow the rightward movement of left end 143a of link member 143 relative to motor control arm 84 during the rotation of control arm 231 from neutral position N to forward traveling speed position F1 of control arm 231. Therefore, motor control arm 84 is held at low speed position A1 to keep the low speed level of axle 5L while the forward traveling speed of axle 5L is increased until it reaches its maximum speed defined by the maximum tilt angle of pump swash plate 41 in its forward traveling tilt range. Finally, when control arm 231 reaches forward traveling speed position F1, left end 143a of link member 143 reaches the right end of slot 84a.

As FIGS. 24A, 24B and 24C illustrate, end portions 233a and 233b maintain pressure pins 231a and 232a tightly nipped therebetween by the spring force of spring 233 so that control arm 231 and pump control arm 232 rotate integrally without rotating relative to each other while control arm 231 is rotated to any position between maximum backward traveling speed position R and forward traveling speed position F1 via neutral position N.

Figure 24D:
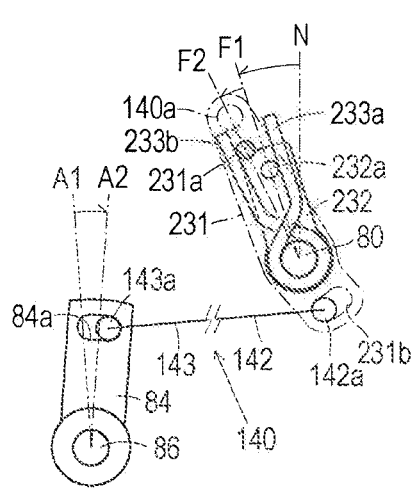
FIG. 24D illustrates the arms when the corresponding manipulator is set at its maximum forward traveling speed position for defining a maximum forward traveling speed of the corresponding axle at a high speed level.

Referring to FIG. 24D, when traveling control lever 12L is moved further in the other direction (in this embodiment, rearward) from its maximum forward traveling speed position at the low speed level defined by setting motor control arm 84 at low speed position A1 until it reaches its maximum forward traveling speed position at the high speed level defined by setting motor control arm 84 at high speed position A2, control arm 231 rotates from forward traveling speed position F1 to pull link member 142 forward via front end 142a disposed at the rear end of slot 231b so as to rotate lateral extension portion 135a further forward and so as to rotate fore-and-aft extension portion 135b further rightward, thereby rotating motor control arm 84 rightward via left end 143a of link member 143 at the right end of slot 84a until motor control arm 84 reaches high speed position A2. Therefore, the rotation of control arm 231 between forward traveling speed position F1 and maximum forward traveling speed position F2 defines the rotation of motor control arm 84 between low speed position A1 and high speed position A2, thereby changing the speed level of the maximum forward traveling speed of axle 5L defined by setting pump swash plate 41 at its maximum tilt angle for forward traveling.

During the rotation of control arm 231 from forward traveling speed position F1 of control arm 231 to maximum forward traveling speed position F2 of control arm 231 while leaving pump control arm 232 at maximum forward traveling speed position F1 of pump control arm 232, pressure pin 231a of control arm 231 connected to traveling control lever 12L pushes one end portion 233b of spring 233 against the spring force of spring 233 away from the other end portion 233a retained by pressure pin 232a of pump control arm 232 at maximum forward traveling speed position F1 of pump control arm 232, thereby causing spring 233 to bias control arm 231 toward forward traveling speed position F1.

Incidentally, as mentioned above, motor control arm 84 of right transaxle unit 4R is shiftable between leftward low speed position A1 and rightward high speed position A2. Therefore, to simultaneously raise the speed levels of both right and left axels 5R and 5L by shifting both motor swash plates 42 of right and left transaxle units 4R and 4L from their low speed positions A1 to their high speed positions A2, both right and left traveling control levers 12R and 12L are simultaneously shifted from their positions corresponding to forward traveling speed positions F1 of control arms 231 to their positions corresponding to maximum forward traveling speed positions F2 of control arms 231 so that right and left bell cranks 135 are rotated laterally symmetrically (i.e., laterally opposite each other) and right and left motor control arms 84 are rotated laterally symmetrically (i.e., laterally opposite each other).

Referring to FIGS. 25 to 28, another operation system 300 for operatively connecting pump swash plate 41 and motor swash plate 42 in transaxle unit 4 (as representative transaxle of right and left transaxles 4R and 4L) to traveling control lever 12 (as representative traveling control lever of right and left traveling control levers 12R and 12L) will be described. Operation system 300 does not use speed shift lever 26 dedicated to controlling of motor swash plates 42, similar to operation system 230 shown in FIGS. 22, 23 and 24A-24D, however, operation system 300 is based on an assumption that transaxle unit 4 includes a later-discussed motor control shaft 302, a later-discussed pivot shaft 307 serving as a fulcrum of motor swash plate 42, a later-discussed pump control shaft 311, and a later-discussed pivot shaft 316 serving as a fulcrum of pump swash plate 41, all of which are parallel in comparison with the foregoing operation system where pump control shaft 80 serving as a fulcrum of pump swash plate 41 is perpendicular to motor control shaft 86 serving as a fulcrum of motor swash plate 42 as shown in FIGS. 22 and 23. Therefore, hydraulic pump 36 with pump swash plate 41 and hydraulic motor 37 with motor swash plate 42 should be arranged in a different way from those illustrated in FIGS. 3-5 and others, however, the movable pump swash plate and the movable motor swash plate adapted to this operation system are referred to as pump swash plate 41 and motor swash plate 42 on the assumption that they have parallel fulcrum axes, just for convenience of description.

Figure 25:
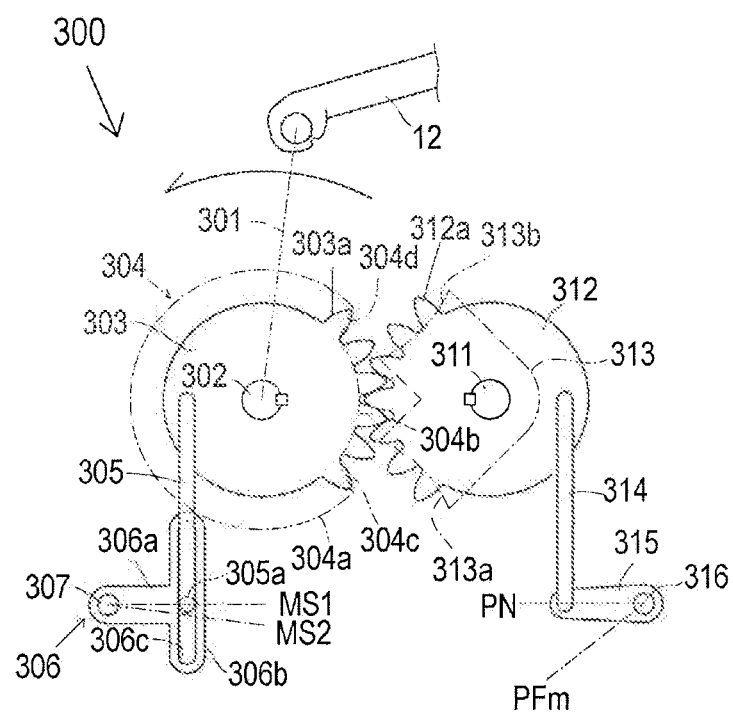
FIG. 25 illustrates an operation system for controlling the hydraulic pump and motor in the transaxle unit by using a common manipulator when the motor swash plate is disposed at a low speed position and the pump swash plate is disposed at a neutral position.

A substantially circular motor gear disc 303 and a substantially circular rotary disc 304 are fixed on motor control shaft 302, so that motor gear disc 303 and rotary disc 304 are rotatable integrally with motor control shaft 302. A substantially circular pump gear disc 312 and a V-shaped holder arm 313 are fixed pump control shaft 311 so that pump gear disc 312 and holder arm 313 are rotatable integrally with pump control shaft 311. As shown in FIG. 25, a link rod 301 is extended from traveling control lever 12 and is pivotally connected at an end thereof to motor gear disc 303. Motor gear disc 303 on motor control shaft 302 is partly formed on a peripheral edge thereof with gear teeth 303a. Pump gear disc 312 on pump control shaft 311 is also partly formed on a peripheral edge thereof with gear teeth 312a for meshing with gear teeth 303a of motor gear disc 303.

Rotary disc 304 has a main peripheral edge 304a defining a main radius of rotary disc 304 from an axis of motor control shaft 302. A part of main peripheral edge 304a of rotary disc 304 is radially recessed to have a peripheral edge 304b defining a radius from the axis of pump control shaft 302 smaller that the main radius of rotary disc 304 defined by main peripheral edge 304a. Peripheral edge 304c is formed between radial edges 304c and 304d. When viewed in the axial direction of motor control shaft 302, a range of peripheral edge 304b substantially corresponds to a range of gear teeth 303a of motor gear disc 303. In other words, two gear teeth 303a at opposite ends of the range of gear teeth 303a of motor gear disc 303 substantially overlap respective radial edges 304c and 304d at opposite ends of the range of peripheral edge 304b.

Holder arm 313 is formed with a pair of arcuate concaves 313a and 313b at end portions of the V-shape thereof. Curvatures of arcuate concaves 313a and 313b are determined to correspond to a curvature of main peripheral edge 304a of rotary disc 304, so that main peripheral edge 304a of rotary disc 304 is adapted to fit either concave 313a or 313b so as to hold holder arm 313 and pump gear disc 312 at a rotational position. When motor gear disc 303 rotates counterclockwise so as to rotate pump gear disc 312 clockwise, concave 313a is used to fit main peripheral edge 304a of rotary disc 304 so as to hold holder arm 313 and pump gear disc 312 at a rotational position defining one maximum tilt angle of pump swash plate 41 as the maximum forward traveling speed position of pump swash plate 41. When motor gear disc 303 rotates clockwise so as to rotate pump gear disc 312 counterclockwise, concave 313b is used to fit main peripheral edge 304a of rotary disc 304 so as to hold holder arm 313 and pump gear disc 312 at a rotational position defining the other maximum tilt angle of pump swash plate 41 as the maximum backward traveling position of pump swash plate 41. Peripheral edge 304b of rotary disc 304 radially smaller than main peripheral edge 304a functions to allow holder arm 313 to rotate freely from rotary disc 304, thereby allowing pump gear disc 312 to follow rotation of motor gear disc 303 due to the meshing of gear teeth 312a with gear teeth 303a.

A pivot shaft 307 serves as a fulcrum of motor swash plate 42, and a motor swash plate arm 306 pivoted on pivot shaft 307 interlocks with motor swash plate 42 so as to be rotatable integrally with motor swash plate 42. Motor swash plate arm 306 is T-shaped so as to have a radial extension portion 306a and a tangent extension portion 306b. Radial extension portion 306a is pivoted at one end thereof on pivot shaft 307 and is joined at the other end thereof to an intermediate portion of tangent extension portion 306b. A slot 306c is formed in tangent extension portion 306b so as to extend lengthwise of tangent extension portion 306b. A link rod 305 is extended from motor gear disc 303 and has an end 305a slidably fitted in slot 306c. Both ends of slot 306c are opposite each other with respect to radial extension portion 306a, however, they have different distances from radial extension portion 306a. One end of slot 306c having a shorter distance from radial extension portion 306a corresponds to end 305a of link rod 305 that comes there when pump swash plate 41 reaches one maximum tilt angle for forward traveling according to counterclockwise rotation of motor gear disc 303 and clockwise rotation of pump gear disc 312. The other end of slot 306c having a longer distance from radial extension portion 306a is more distant from radial extension portion 306a than a position in slot 306c corresponding to end 305a of link rod 305 that comes there when pump swash plate 41 reaches the other maximum tilt angle for backward traveling according to clockwise rotation of motor gear disc 303 and counterclockwise rotation of pump gear disc 312.

A pivot shaft 316 serves as a fulcrum of pump swash plate 41, and a pump swash plate arm 315 pivoted on pivot shaft 316 interlocks with pump swash plate 41 so as to be rotatable integrally with pump swash plate 41. A link rod 314 is extended from pump gear disc 312 and is pivotally connected at an end thereof to a rotatable end of pump swash plate arm 315.

An operation of operation system 300 will be described with reference to FIGS. 25 to 28. Incidentally, it is assumed that motor gear disc 303 and rotary disc 304 are rotated counterclockwise as arrowed in FIG. 25 to increase a forward traveling speed of axle 5 (as a representative axle of right and left axles 5R and 5L). Referring to FIG. 25, traveling control lever 12 is disposed at its neutral position so as to set motor gear disc 303 and rotary disc 304 at an initial position MA1, thereby setting motor swash plate arm 306 and motor swash plate 42 at a low speed position MS1, and thereby setting pump swash plate arm 315 and pump swash plate 41 at a neutral position PN. In this state, gear teeth 303*a* of motor gear disc 303 mesh with gear teeth 312*a* of pump gear disc 312. More specifically, when motor gear disc 303 is located at initial position MA1, gear teeth 303*a* at a middle position of the range of gear teeth 303*a* mesh with gear teeth 312*a* at a middle position of the range of gear teeth 312*a*, thereby ensuring even ranges for rotation of pump gear disc 312 in opposite directions from the position corresponding to initial position MA1 of motor gear disc 303 and neutral position PN of pump swash plate 41.

Figure 26:
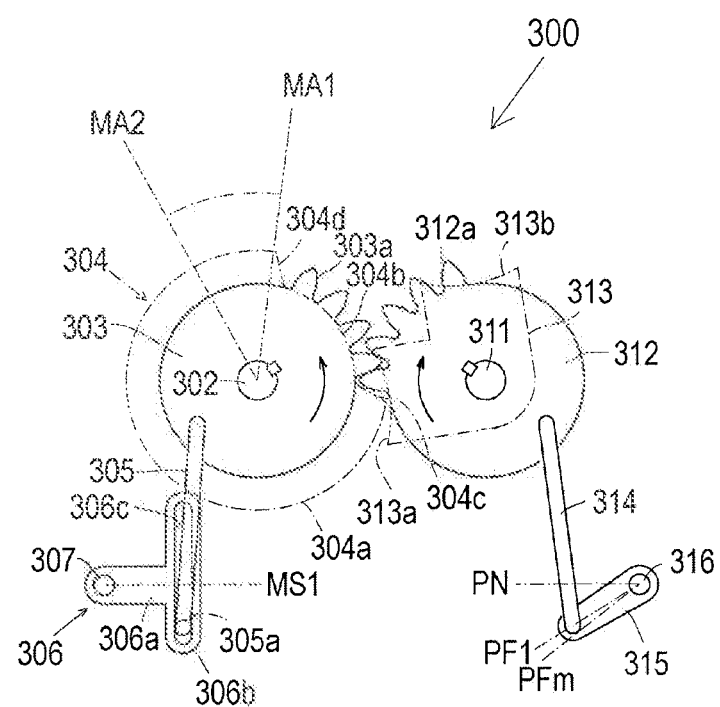
FIG. 26 illustrates the operation system of FIG. 25 when the motor swash plate is disposed at the low speed position and the pump swash plate is tilted in one direction before reaching a maximum tilt angle.

Referring to FIG. 26, traveling control lever 12 moves to a forward traveling speed position so as to rotate motor gear disc 303 counterclockwise from initial position MA1 to a rotational position MA2. During this rotation of motor gear disc 303 from initial position MA1 to position MA2, end 305*a* of link rod 305 is allowed to slide in slot 306*c* toward the end of slot 306*c* having the shorter distance from radial extension portion 306*a* of motor swash plate arm 306 so as to allow motor swash plate arm 306 and motor swash plate 42 to remain at low speed position MS1. Further, due to the counterclockwise rotation of motor gear disc 303 from initial position MA1 to rotational position MA2, pump gear disc 312 having gear teeth 312*a* meshing with gear teeth 303*a* rotates clockwise as arrowed, thereby rotating pump swash plate arm 315 and pump swash plate 41 to a tilt angle PF1 immediately before reaching a maximum tilt angle PFm defining a maximum forward traveling speed position of pump swash plate 41. A final gear tooth 312*a* of pump gear disc 312 still meshes with a final gear tooth 303*a* of motor gear disc 303 so that pump gear disc 312 and holder arm 313 are still rotatable clockwise according to further counterclockwise rotation of motor gear disc 303 and rotary disc 304 (until pump swash plate arm 315 reaches maximum tilt angle PFm).

Figure 27:
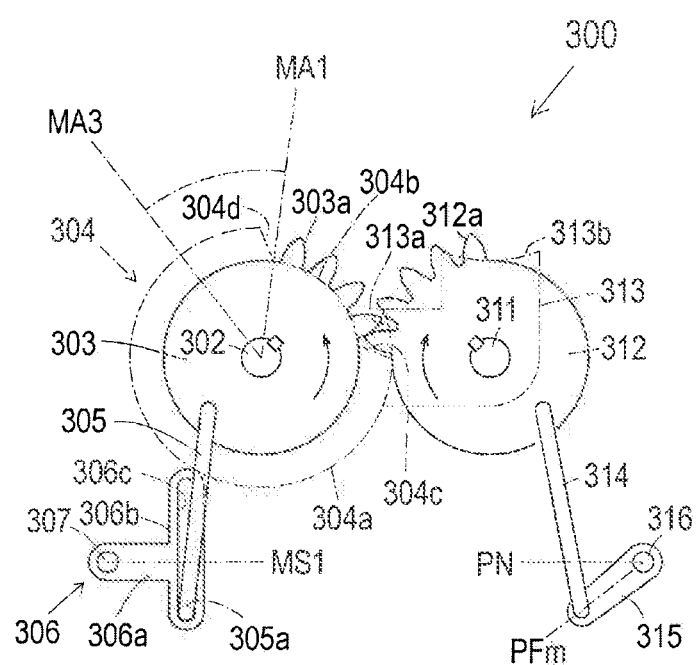
FIG. 27 illustrates the operation system of FIG. 25 when the motor swash plate is disposed at the low speed position and the pump swash plate reaches the maximum tilt angle.

Referring to FIG. 27, traveling control lever 12 reaches a maximum forward traveling speed position at the low speed level so that motor gear disc 303 having left rotational position MA2 reaches a rotational position MA3. At this time, end 305*a* of link rod 305 reaches the end of slot 306*c* having the shorter distance from radial extension portion 306*a* of motor swash plate arm 306, however, motor swash plate arm 306 is still free from link rod 305 so as to remain at low speed position MS1. On the other hand, the final gear tooth 303*a* and the final gear tooth 312*a* part from each other so that gear teeth 312*a* of pump gear disc 312 no further mesh with gear teeth 303*a* of motor gear disc 303, i.e., pump gear disc 312 and holder arm 313 no further rotate clockwise following the counterclockwise rotation of motor gear disc 303 unless motor gear disc 303 rotates back clockwise so as to bring gear teeth 303*a* meshing with gear teeth 312*a*. This rotational position of holder arm 313 and pump gear disc 312 where they cannot further rotate clockwise defines maximum tilt angle PFm of pump swash plate arm 315 and pump swash plate 41 defining the maximum forward traveling speed position of pump swash plate 41. Meanwhile, radial edge 304*c* passes concave 313*a* and then main peripheral edge 304*a* of rotary disc 304 fit concave 313*a* so as to keep holder arm 313 from deviating from the predetermined rotational position defining the maximum forward traveling speed position of pump swash plate 41.

Figure 28:
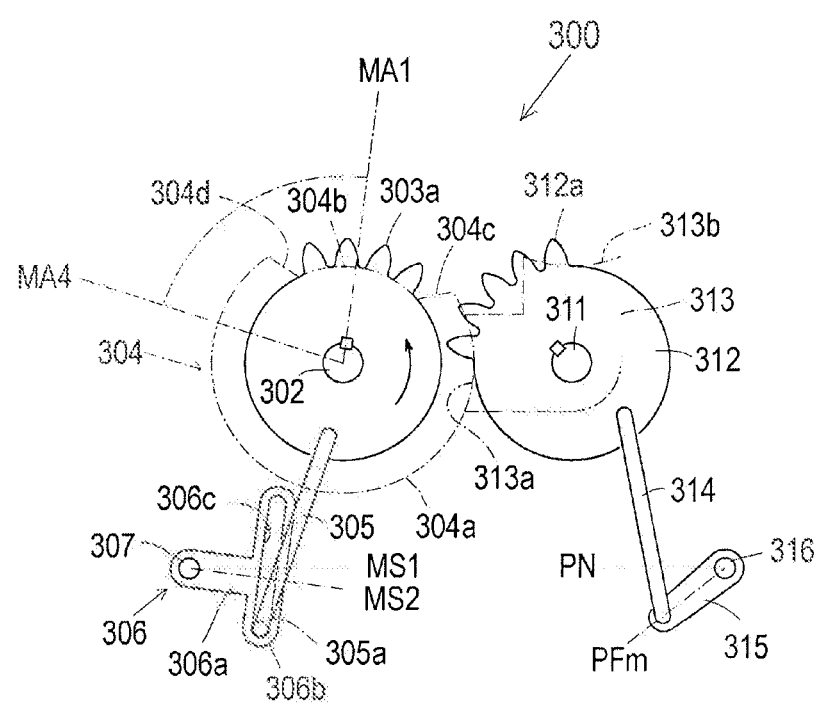
FIG. 28 illustrates the operation system of FIG. 25 when the motor swash plate is disposed at a high speed position while the pump swash plate is held at the maximum tilt angle.

Referring to FIG. 28, traveling control lever 12 reaches a maximum forward traveling speed position at the high speed level so that motor gear disc 303 having left rotational position MA3 reaches a rotational position MA4. Due to the counterclockwise rotation of motor gear disc 303 from rotational position MA3 to rotational position MA4, link rod 305 pushes motor swash plate arm 305 via end 305*a* of link rod 305 at the end of slot 306*c* so that motor swash plate arm 305 and motor swash plate 42 reach a high speed position MS2. On the other hand, during the counterclockwise rotation, of motor gear disc 303 and rotary disc 304 from rotational position MA3 to rotational position MA4, holder arm 313 is retained at the above-mentioned position defined by concave 313*a* fitting main peripheral edge 304*a* of rotary click 304 while allowing rotary disc 304 to rotate relative to holder arm 313, thereby holding pump swash plate arm 315 and pump swash plate 41 at maximum tilt angle PFm defining the maximum forward traveling speed position of pump swash plate 41.

As understood from the above-mentioned operation, another operation of this operation system for moving pump swash plate 41 from neutral position PN to another maximum tilt angle defining the maximum backward traveling speed position of pump swash plate 41 depends on clockwise rotation of motor gear disc 303 and counterclockwise rotation of pump gear disc 312 following the clockwise rotation of motor gear disc 303. Concave 313*b* is used to fit main peripheral edge 304*a* so as to retain pump swash plate 41 at the maximum backward traveling position. In this regard, due to the above-mentioned longer distance of the other end of slot 306*c* from radial extension portion 306*a*, end 305*a* of link rod 305 is still allowed to slide in slot 306*c* so as to hold motor swash plate arm 306 and motor swash plate 42 at low speed position MS1 regardless of further clockwise rotation of motor gear disc 303 while leaving pump swash plate 41 at the maximum backward traveling speed position. Therefore, only the low speed level defined by motor swash plate 42 at low speed position MS1 is provided for the maximum backward traveling speed of axle 5 defined by pump swash plate 41 at the maximum backward traveling speed position.

An operation system for changing a change ratio of rotational angle of motor swash plate 42 to motor control arm 84 will be described with reference to FIGS. 29 to 33. This operation system for controlling motor swash plate 42 is adaptable to both operation system 200 (or 210 or 220) using three manipulators 12R, 12L and 26 (or 211) as shown in FIGS. 12 and 19 (or 20 or 21) and operation system 230 (or 300) using two manipulators 12R and 12L as shown in FIGS. 22, 23 and 24A-24D (or 25-28).

Figure 29:
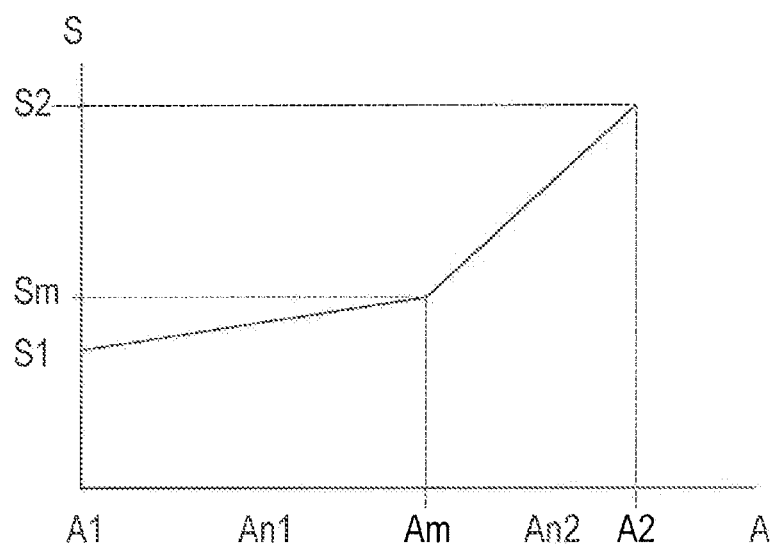
FIG. 29 is a graph indicating variation of a speed level of the corresponding axle (i.e., an output speed of the hydraulic motor) relative to a rotational position of the corresponding traveling control lever.
Figure 30:
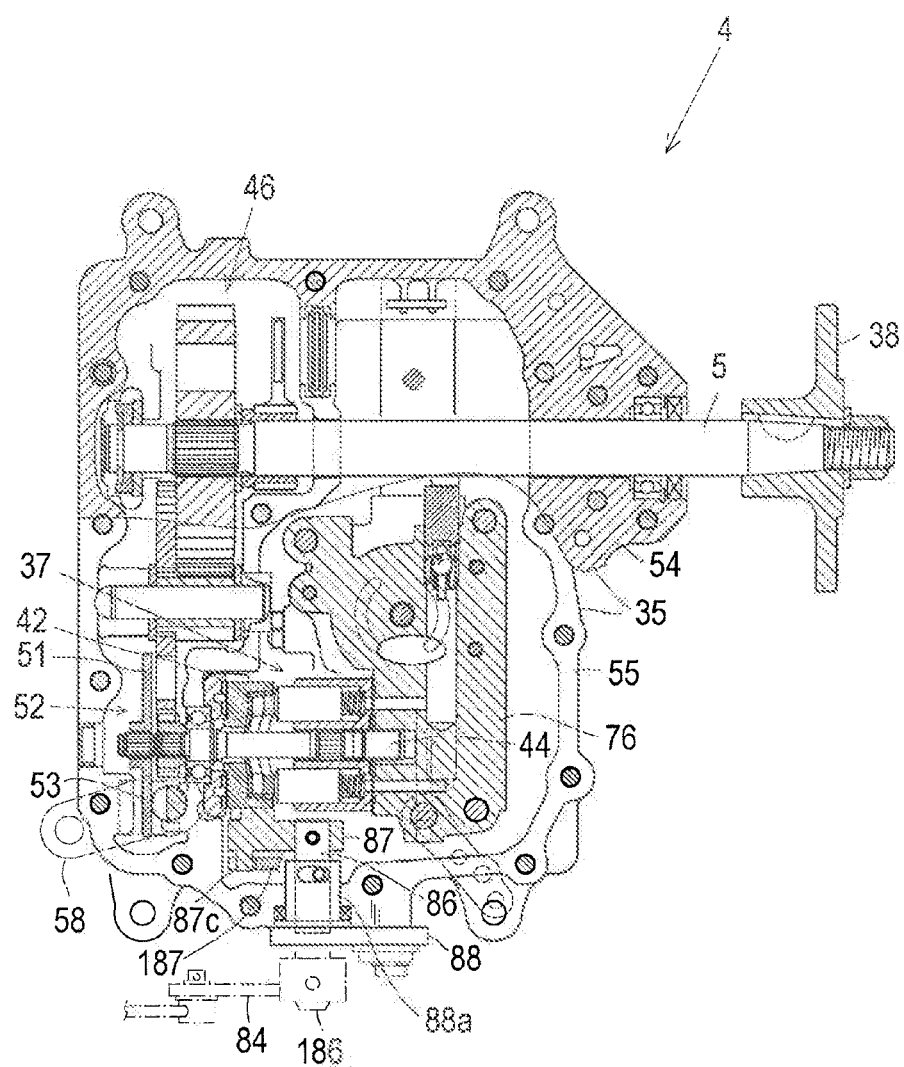
FIG. 30 is a sectional plan view of a representative transaxle unit provided with a motor displacement control mechanism configured to achieve the graph of FIG. 29.

This operation system is provided to realize a graph of FIG. 29. A rotational angle A of motor control arm 84 is changeable between low speed angle (position) A1 defining a low speed level S1 of axle 5 (as a general name for axles 5 R and 5L) and high speed angle (position) A2 defining a high speed level S2 of axle 5. An intermediate angle Am between low and high speed angles A1 and A2 defines a tilt angle of motor swash plate 42 for realizing an intermediate speed level Sm of axle 5 between and high speed levels S1 and S2. A speed level S of axle 5 rises steplessly (e.g., proportionally) and gradually according to change of angle A from low speed angle A1 to intermediate angle Am, whereas speed level S of axle 5 rises steplessly (e.g., proportionally) and steeply according to change of angle A from intermediate angle Am to high speed angle A2. An any angle A between low speed angle A1 and intermediate angle Am is referred to as an angle An1, and an any angle A between intermediate angle Am and high speed angle A2 is referred to as an angle An2. The gradual change of speed level S according to change of angle An1 ensures a safe low speed traveling adaptable as a working travel of vehicle 1. The steep change of speed level S according to change of angle An2 ensures an efficient speed change of vehicle 1 adaptable as a normal travel of vehicle 1 on road.

Figure 7:
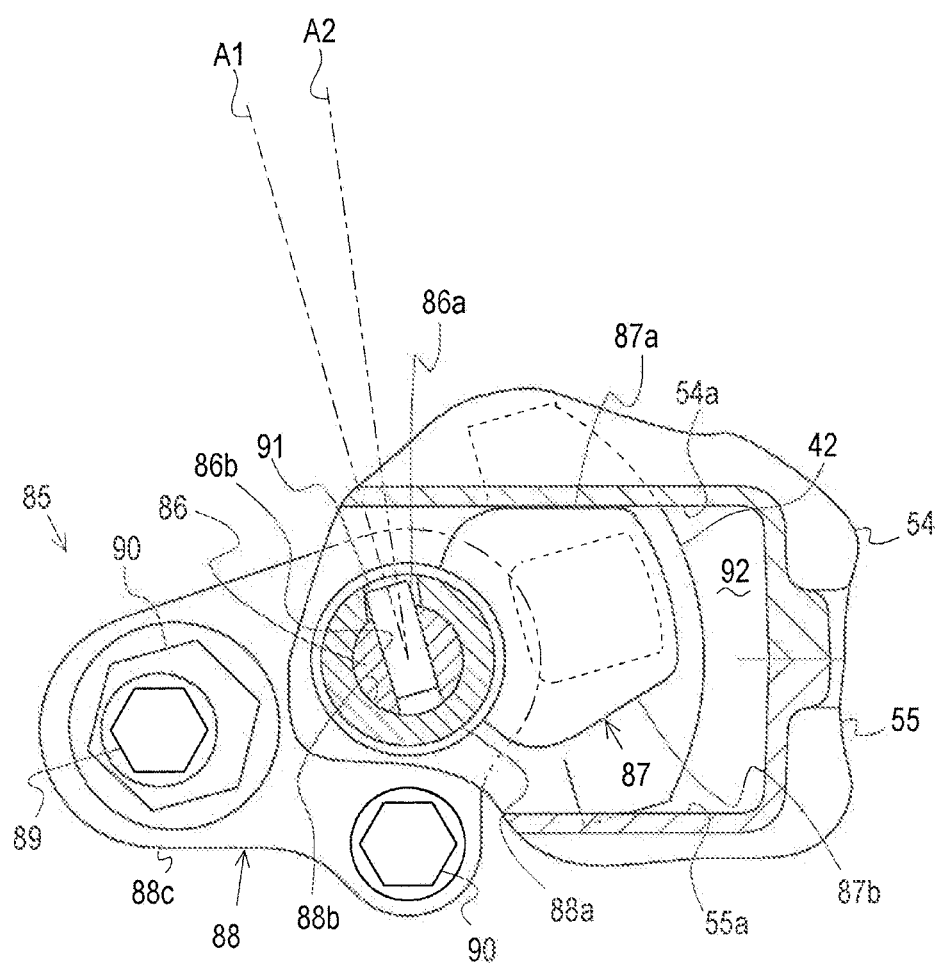
FIG. 7 is a fragmentary sectional front view of one of the right and left transaxle units showing a tilt angle adjusting mechanism for a hydraulic motor in the transaxle unit.
Figure 8:
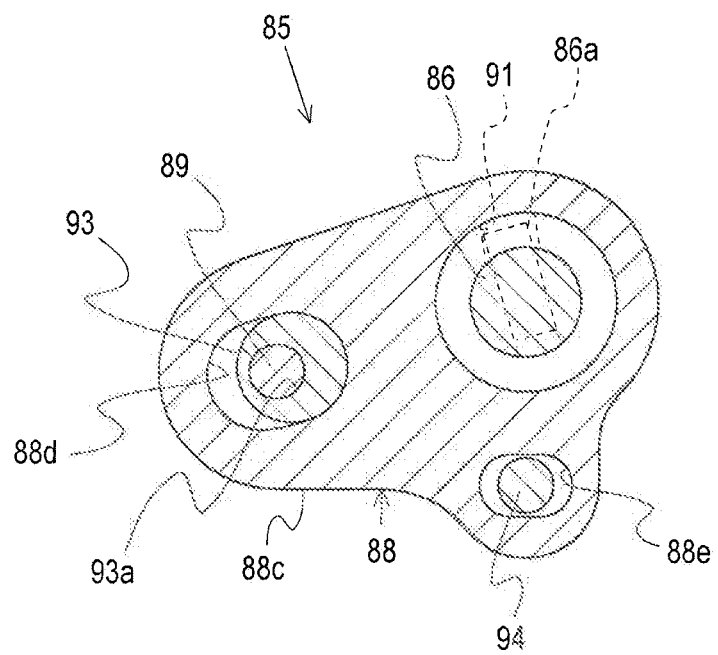
FIG. 8 is a front sectional view of a shaft holder for the tilt angle adjusting mechanism.

Referring to FIGS. 30 to 33, to realize the graph of FIG. 29, a cam system is interposed between motor control arm 84 and motor swash plate 42. In this regard, motor control shaft 86 is connected to motor swash plate 42 via arm 87 similarly to motor control shaft 86 as shown in FIGS. 3 and 7, whereas motor control arm 84 is provided on an additional motor control an shaft 186 extended parallel to motor control shaft 86. In transaxle casing 35, inner arm 87 connecting pump control shaft 86 to motor swash plate 42 has as cam pin 87c. In transaxle casing 35, a cam arm 187 is extended from motor control arm shaft 186 so as to abut against cam pin 870. A portion of cam arm 187 which can abut against cam pin 87c is formed with an edge 187a having an angle relative to cam pin 87c, and is formed with an edge 187c having another angle relative to cam pin 87c. A joint point 187b of edges 187a and 187c has an angle between edges 187a and 187c. The angle of edge 187a relative to cam pin 87c defines the gradual change of speed level S (i.e., the tilt angle of motor swash plate 42) relative to change of angle An1 of motor control arm 84. The angle of edge 187c relative to cam pin 87c defines the steep change of speed level S (i.e., the tilt angle of motor swash plate 42) relative to change of angle An2 of motor control arm 84. The angle at joint point 187b between edges 187a and 187c defines a difference between the relative change of speed level S to angle An1 and the relative change of speed level S to angle An2. The length of edge 187a longer than the length of edge 187c corresponds to the range of angle An1 larger than the range of angle An2.

Figure 31:
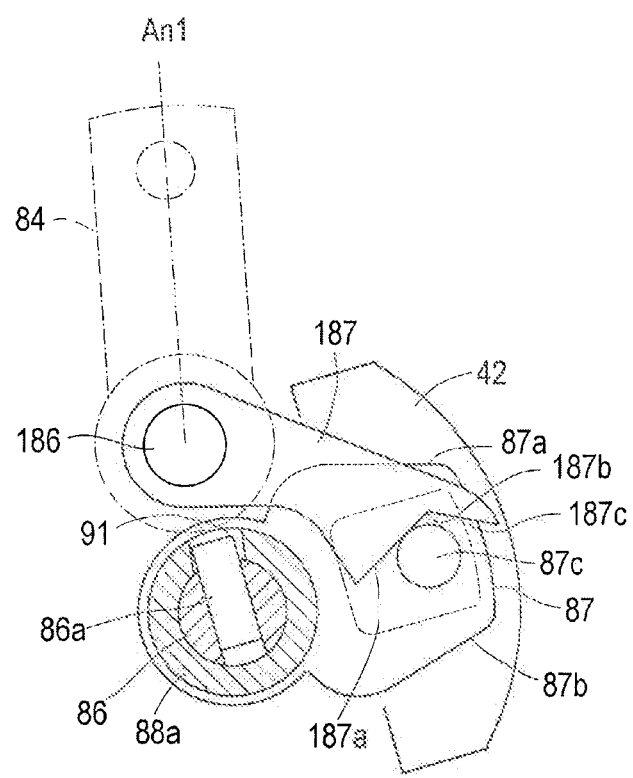
FIG. 31 illustrates the motor displacement control mechanism set in a low speed range.
Figure 32:
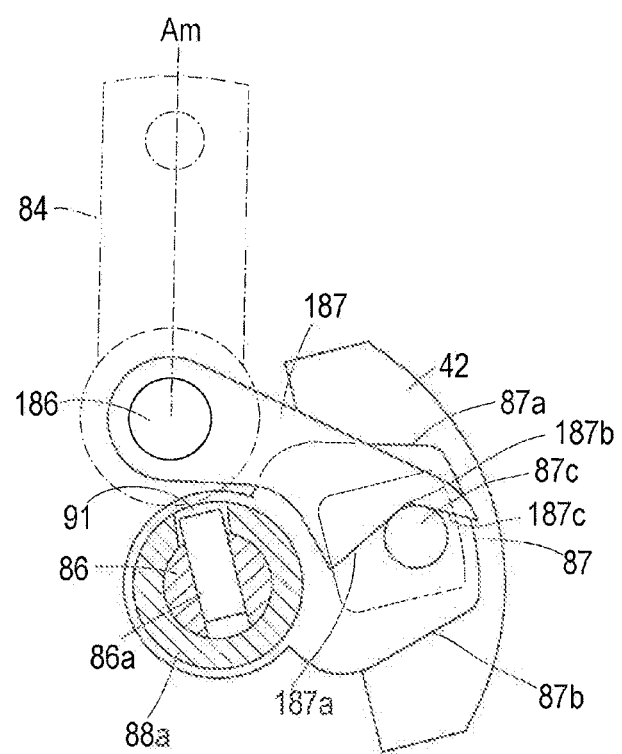
FIG. 32 illustrates the motor displacement control mechanism set at an intermediate position.
Figure 33:
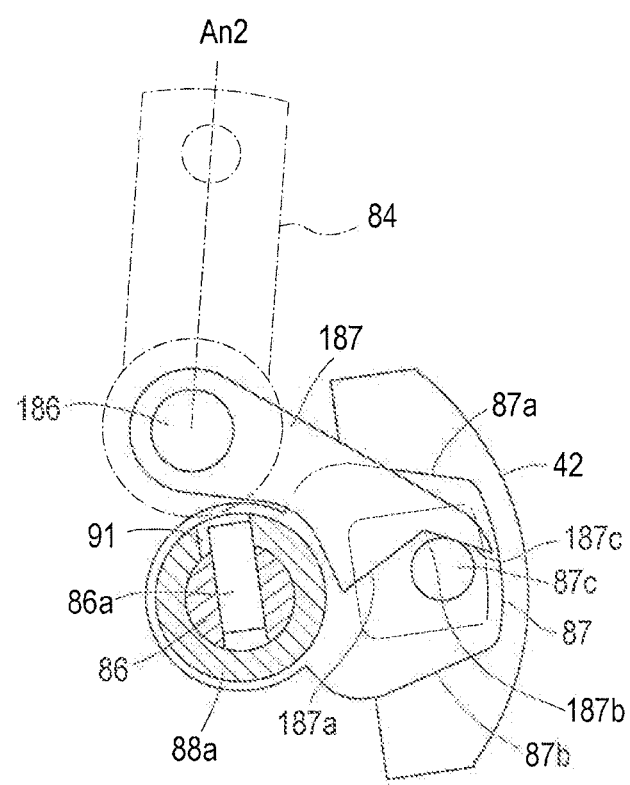
FIG. 33 illustrates the motor displacement control mechanism set in a high speed range.

Referring to FIG. 31, cam pin 87c abuts against edge 187a of cam arm 187 when motor control arm 84 is disposed at angle An1 between low speed angle A1 and intermediate angle Am. Referring to FIG. 32, cam pin 87c reaches joint point 187b of cam arm 187 when angle A of motor control arm 84 reaches intermediate angle Am. Referring to FIG. 33, cam pin 87c abuts against edge 187c of cam arm 187 when motor control arm 84 is disposed at angle An2 between intermediate angle Am and high speed angle A2.

This operation system can be advantageously simplified because of the constant change rate of angle A of motor control arm 84 according to manipulation of traveling control lever 12R or 12L or speed shift lever 26 and because of the simple can system including cam arm 187 for ensuring the different change rates of speed level S (i.e., angle of motor swash plate 42) to angle A of motor control arm 84.

It is further understood by those skilled in the art that the foregoing description is a preferred embodiment of the disclosed apparatus and that various changes and modifications may be made in the invention without departing from the scope thereof defined by the following claims.

What is claimed is:

1. A transaxle system for a vehicle comprising:
right and left axles drivingly connected to respective right and left drive wheels of the vehicle;
right and left transaxle units mounted in the vehicle so as to drive the respective right and left axles, each of the right and left transaxle units including a variable displacement hydraulic motor for driving the corresponding right or left axle, a variable displacement hydraulic pump for supplying fluid to the corresponding hydraulic motor, and a transaxle casing supporting the corresponding right or left axle and incorporating the corresponding hydraulic pump and the corresponding hydraulic motor,
wherein the right and left axles project distally in the lateral direction of the vehicle from the respective transaxle casings of the right and left transaxle units,
wherein the hydraulic motor of each of the right and left transaxle units is provided with a motor displacement control means that is shiftable between a large displacement position and a small displacement position, whereby the motor displacement control means of the respective right and left transaxle units are operatively connected to respective motor control arms pivoted on outsides of the respective transaxle casings, and
wherein the hydraulic pump of each of the right and left transaxle units is provided with a pump displacement control means that is shiftable to change fluid delivery amount and direction of the corresponding hydraulic pump, whereby the pump displacement control means of the respective right and left transaxle units are operatively connected to respective pump control arms pivoted on outsides of the respective transaxle casings;
a single motor controlling manipulator provided in the vehicle and operatively connected to both the motor control arms so that the motor controlling manipulator is manipulable to simultaneously rotate both the motor control arms so as to simultaneously shift both the motor displacement control means;
right and left pump controlling manipulators provided in the vehicle and operatively connected to the respective pump control arms so that the right and left pump controlling manipulators are manipulable to individually rotate the respective pump control arms so as to individually shift the respective pump displacement control means;
right and left first link members operatively connected to the motor controlling manipulator;
right and left second link members extended parallel to the right and left axles and operatively connected to the respective motor control arms of the right and left transaxle units; and
right and left bell cranks each of which has a pivot axis and first and second extension portions extended from the pivot axis perpendicularly to each other, wherein the right and left first link members are connected to the respective first extension portions of the right and left bell cranks, and the right and left second link members are connected to the respective second extension portions of the right and left bell cranks.

2. A transaxle system for a vehicle comprising:
right and left axles drivingly connected to respective right and left drive wheels of the vehicle;
right and left transaxle units mounted in the vehicle so as to drive the respective right and left axles, each of the right and left transaxle units including a variable displacement hydraulic motor for driving the corresponding right or left axle, a variable displacement hydraulic pump for supplying fluid to the corresponding hydraulic motor, and a transaxle casing supporting the corresponding right or left axle and incorporating the corresponding hydraulic pump and the corresponding hydraulic motor,
wherein the right and left axles project distally in the lateral direction of the vehicle from the respective transaxle casings of the right and left transaxle units,
wherein the hydraulic motor of each of the right and left transaxle units is provided with a motor displacement control means that is shiftable between a large displacement position and a small displacement position, whereby each of the motor displacement control means of the respective right and left transaxle units is operatively connected to a motor control arm rotatably pivoted on an outside portion of the corresponding transaxle casing, and wherein the hydraulic pump of each of the right and left transaxle units is provided with a pump displacement control means that is shiftable to change fluid delivery amount and direction of the hydraulic pump, whereby each of the pump displacement control means of the respective right and left transaxle units is operatively connected to a pump control arm which is pivoted together with an auxiliary arm on another outside portion of the corresponding transaxle casing other than the outside portion of the corresponding transaxle casing having the motor control arm pivoted thereon; and right and left pump controlling manipulators provided in the vehicle and operatively connected to the respective auxiliary arms so that the right and left pump controlling manipulators are manipulable to rotate the respective pump control arms via the respective auxiliary arms so as to shift the respective pump displacement control means, wherein each of the right and left pump controlling manipulators is also operatively connected to the corresponding motor control arm via the corresponding auxiliary arm so that each of the right and left pump controlling manipulators is also manipulable to rotate the corresponding motor control arm via the corresponding auxiliary arm while leaving the corresponding pump control arm at a limit position so as to shift the corresponding motor displacement control means from the large displacement position to the small displacement position only if the corresponding pump control arm is set at the limit position to maximize the displacement of the corresponding hydraulic pump delivering fluid in a direction for forward traveling of the vehicle.

3. The transaxle system according to claim 2, wherein a rotation range of each of the motor control arms for shifting the corresponding motor displacement control means from the large displacement position to the small displacement position includes a first range and a second range following the first range so that a first shift rate of the motor displacement control means relative to rotation of the motor control arm in the first range is smaller than a second shift rate of the motor displacement control means relative to rotation of the motor control arm in the second range.

* * * * *